(12) United States Patent
Hironishi et al.

(10) Patent No.: US 7,535,616 B2
(45) Date of Patent: May 19, 2009

(54) POLARIZATION CONTROLLING APPARATUS AND POLARIZATION OPERATION APPARATUS

(75) Inventors: Kazuo Hironishi, Kawasaki (JP); Nobuhiro Fukushima, Kawasaki (JP); Jens Rasmussen, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 107 days.

(21) Appl. No.: 11/529,347

(22) Filed: Sep. 29, 2006

(65) Prior Publication Data

US 2007/0242340 A1    Oct. 18, 2007

(30) Foreign Application Priority Data

Apr. 17, 2006    (JP) .............................. 2006-113873

(51) Int. Cl.
*G02F 1/09* (2006.01)

(52) U.S. Cl. ....................... 359/283; 359/280

(58) Field of Classification Search ................. 359/280, 359/281, 282, 283, 246, 256, 257, 320, 324; 324/205, 244.1

See application file for complete search history.

(56) References Cited

U.S. PATENT DOCUMENTS

| 6,466,704 | B1 | 10/2002 | Frisken |
| 6,973,821 | B2 | 12/2005 | Corcoran |
| 7,002,732 | B2 | 2/2006 | Iwatsuka |
| 7,196,847 | B2 * | 3/2007 | Ye .............................. 359/501 |

FOREIGN PATENT DOCUMENTS

| EP | 0 905 532 A2 | 3/1999 |
| JP | 61-187101 | 8/1986 |
| JP | 03 142415 A | 6/1991 |
| JP | 06 051255 A | 2/1994 |
| JP | 61-051255 | 2/1994 |
| JP | 9-61772 | 3/1997 |
| JP | 9-211405 | 8/1997 |

(Continued)

OTHER PUBLICATIONS

Heismann, F. et al.: "Fast Automatic Polarization Control System"; IEEE Photonics Technology Letters, IEEE Service Center, Piscataway, NJ, US, vol. 4, No. 5, May 1, 1992, pp. 503-505 XP000272654.

(Continued)

*Primary Examiner*—Hung X Dang
*Assistant Examiner*—Tuyen Q Tra
(74) *Attorney, Agent, or Firm*—Staas & Halsey LLP

(57) ABSTRACT

A polarization controlling apparatus includes a permanent magnet itself or a permanent magnet to which a part capable of being magnetized is applied, an electromagnet capable of changing the magnitude of a magnetic field to be generated thereby, and a Faraday rotation effect element. The Faraday rotation effect element is disposed at a position at which an interaction magnetic field acts on the Faraday rotation effect element. The interaction magnetic field is produced by an interaction between a magnetic field generated by the permanent magnet and a magnetic field generated by the electromagnet. The Faraday rotation effect element thereby produces a Faraday rotation effect on inputted light. The magnitude of the interaction magnetic field in the Faraday rotation effect element is varied by a magnetic field component generated by the electromagnet to vary the amount of the Faraday rotation effect to be had on the inputted light.

17 Claims, 23 Drawing Sheets

FOREIGN PATENT DOCUMENTS

JP 2005-99737 4/2005

OTHER PUBLICATIONS

Prat, J. et al. "Experimental Demonstration Of An All Fiber Endless Polatization Controller based on Faraday Rotation"; IEEE Photonics Technology Letters, IEEE Service Center, Piscataway, NJ, US vol. 7, No. 12.

(European Search Report EP 06 02 0272) dated Sep. 25, 2007).

Partial European search report, dated Jul. 23, 2007, Application No. 06020272.8-2205, Reference No. 177 646 a/km, pp. 1-4.

* cited by examiner

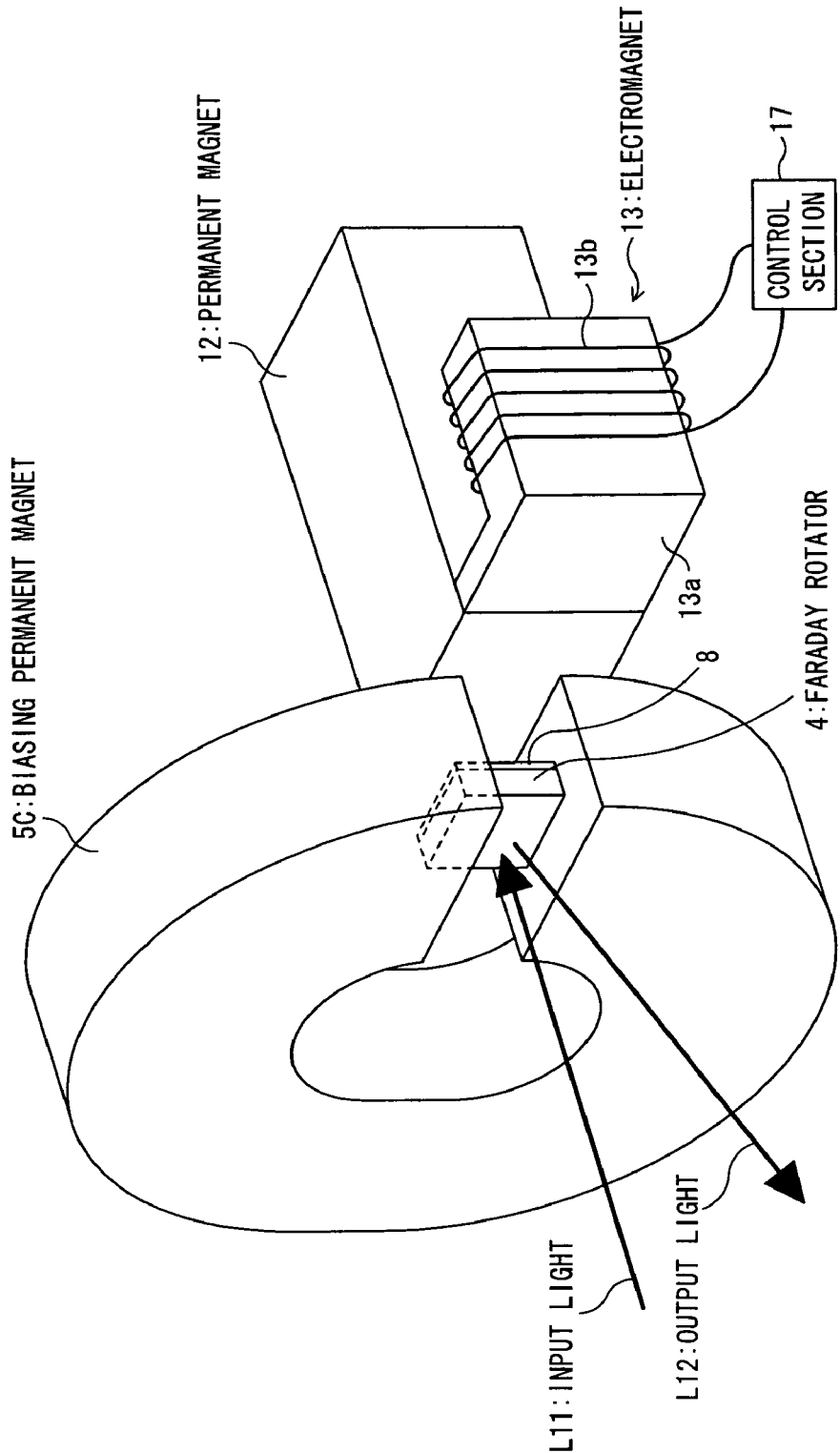

POLARIZATION CONTROLLING APPARATUS AND POLARIZATION OPERATION APPARATUS

BACKGROUND OF THE INVENTION

1) Field of the Invention

This invention relates to a polarization controlling apparatus and a polarization operation apparatus suitable for use in the fields of optical communication, optical signal processing, optical measurement and so forth, and more particularly to a polarization controlling apparatus and a polarization operation apparatus suitable for use as a component of a high-speed polarization scrambler in optical communication.

2) Description of the Related Art

A Faraday rotator is an optical device which rotates the polarization state of input light using a Faraday effect of rotating the polarization state of light using a magnetic field applied in the direction of an optical axis of the light. And the Faraday rotator is applied not only to optical isolators and circulators but also to polarization scramblers and like devices. Polarization scrambler to which the Faraday rotator is applied is demanded a performance of being variable the amount of rotation of the polarization state, and also it is demanded to achieve a higher-speed response.

Some conventional polarization controlling apparatus has a configuration such that a permanent magnet provides with a fixed magnetic field for biasing in order to minimize the loss of output light by formation of a single magnetic domain. However, a magnetic field generated by an electromagnet is progressively used directly as a magnetic field to be applied in the direction of an optical axis of light which has a direct relationship with the amount of rotation of the polarization state of light by a Faraday effect.

Also in techniques disclosed in Patent Documents 1 to 5 hereinafter mentioned, a magnetic field generated by an electromagnet exerts a Faraday effect directly on input light. Then, the current to a coil of the electromagnet is varied to vary the magnetic field to be generated by the electromagnet thereby to vary the magnitude of the Faraday effect to be applied to a ray of light which passes through the Faraday rotator.

Further, some known polarization scrambler which uses a Faraday rotation effect has a configuration wherein a single wave plate is interposed between two or four Faraday rotators (refer to Patent Document 3 or Patent document 4).

[Patent Document 1] Japanese Patent Publication No. Hei 6-9082

[Patent Document 2] Japanese Patent No. 2815509

[Patent Document 3] Japanese Patent Laid-Open No. Hei 9-61772

[Patent Document 4] Japanese Patent Laid-Open No. Hei 9-211405

[Patent Document 5] Japanese Patent Laid-Open No. 2005-99737

However, only if the magnetic field to be applied in the direction of an optical axis of light is varied by an electromagnet as described above, some restriction possibly appears to the degree of freedom in design of a polarization controlling apparatus because, when a configuration for application of a magnetic field is added to an optical system in designing of an apparatus, it is necessary for the optical axis to be set along the application direction of the magnetic field which is specified by the shape of the electromagnet.

Further, in order to increase the variation amount of the magnetic field of an electromagnet, it is a possible idea to increase the number of turns of a winding (coil) of the electromagnet or increase the value of the current to be supplied to the winding. However, if the number of turns of the winding is increased, then the inductance of the coil increases, which makes a high-speed operation difficult, and besides, increase of the apparatus scale cannot be avoided. On the other hand, if the current is increased, then since there is no necessity to increase the number of turns of the coil, increase of the inductance can be suppressed. Consequently, a high-speed operation is permitted. However, increase of the power dissipation cannot be avoided.

Accordingly, both of increase of the number of turns of the winding and increase of the current to be supplied to the winding have a factor of making an obstacle to the apparatus design. Also from this, it is considered that the degree of freedom in design of a polarization controlling apparatus may be subject to some restriction.

Further, such a polarization scrambler of a configuration wherein one wave plate is interposed between two or four Faraday rotators as disclosed in Patent Document 3 or 4 fails to sufficiently implement various polarization states.

SUMMARY OF THE INVENTION

It is an object of the present invention to provide a polarization controlling apparatus wherein the degree of freedom in apparatus design can be enhanced while increase of the power dissipation and increase of the apparatus scale are suppressed and a high-speed operation can be achieved.

It is another object of the present invention to provide a polarization operation apparatus which implements various polarization states.

In order to attain the objects described above, according to an aspect of the present invention, there is provided a polarization controlling apparatus comprising a permanent magnet, an electromagnet capable of changing the magnitude of a magnetic field to be generated thereby, and a Faraday rotation effect element, disposed at a position at which an interaction magnetic field produced by an interaction between a magnetic field generated by the permanent magnet itself or by the permanent magnet having a magnetic pole to which a part capable of being magnetized is applied and a magnetic field generated by the electromagnet acts, for producing a Faraday rotation effect on inputted light by means of the interaction magnetic field, the magnitude of the interaction magnetic field in the Faraday rotation effect element being varied by a magnetic field component generated by the electromagnet to vary the amount of the Faraday rotation effect to be had on the inputted light.

The polarization controlling apparatus may further comprise a control section for variably controlling the magnetic field component to be generated by the electromagnet in response to the amount of the Faraday rotation effect to be produced on the inputted light.

An optical path for a direction same as or opposite to the direction of the interaction magnetic field may be provided for the inputted light.

The polarization controlling apparatus may further comprise a reflection member for reflecting the inputted light having passed through the Faraday rotation effect element.

The polarization controlling apparatus may further comprise a bias magnetic field application section for applying a bias magnetic field for magnetizing the Faraday rotation effect element into a saturation state in a direction perpendicular to the interaction magnetic field.

The electromagnet may include a core member made of a ferrite material and a winding provided on the core member.

The polarization controlling apparatus may be configured such that the electromagnet is disposed such that a face thereof which serves as a magnetic pole face is opposed to one of magnetic pole faces of the permanent magnet itself or of the permanent magnet having a magnetic pole to which a part capable of being magnetized is applied, and the Faraday rotation effect element is disposed at a position at which a magnetic field in a direction substantially in parallel to a plane positioned between the magnetic pole faces opposed to each other by the permanent magnet and the electromagnet acts as the interaction magnetic field.

In this instance, the polarity of the magnetic pole of the electromagnet opposed to the permanent magnet may be determined as the polarity same as that of the magnetic pole of the permanent magnet which is opposed to the electromagnet to increase the magnitude of the interaction magnetic field to the amount of the Faraday rotation effect to be had on the inputted light. Or, a substance whose magnetic relative permeability in a non-saturation state is 10 or less may be interposed between the magnetic pole faces opposed to each other of the permanent magnet itself or of the permanent magnet having a magnetic pole to which a part capable of being magnetized is applied and the electromagnet.

Preferably, the electromagnet may include a first core section which contacts at one end thereof with one of the magnetic pole sides of the permanent magnet itself or of the permanent magnet having a magnetic pole piece to which a part capable of being magnetized is applied, a second core section disposed such that one end thereof is connected to the other end of the first core section and the other end thereof is positioned near to the other magnetic pole side of the permanent magnet itself or of the permanent magnet having a magnetic pole piece to which apart capable of being magnetized is applied, and a winding provided on the second core section, the Faraday rotation effect element being disposed in the proximity of the one or the other magnetic pole of the permanent magnet, a magnetic field component to be generated by the electromagnet being variably controlled by current to be supplied to the winding to vary the amount of the Faraday rotation effect to be had on the inputted light.

In this instance, the direction of the magnetic field component to be generated by the electromagnet may be determined as a direction opposite to a magnetic field direction generated by the permanent magnet to increase the magnitude of the interaction magnetic field thereby to increase the amount of the Faraday rotation effect to be had on the inputted light. Or, the first core section may be made of a substance whose relative magnetic permeability in a non-saturation state is 10 or more.

The polarization controlling apparatus may be configured such that the electromagnet is disposed such that a face whereof which functions as a magnetic pole face is opposed to one of magnetic pole faces of the permanent magnet, and the Faraday rotation effect element is disposed at a position at which a magnetic field in a direction substantially perpendicular to a plane positioned between the magnetic pole faces opposed to each other of the permanent magnet and the electromagnet acts as the interaction magnetic field.

In this instance, the direction of a magnetic field component to be generated by the electromagnet may be determined as a direction same as a magnetic field direction generated by the permanent magnet to increase the magnitude of the interaction magnetic field thereby to increase the amount of the Faraday rotation effect to be had on the inputted light. Or, a substance whose relative magnetic permeability in a non-saturation state is 10 or less is interposed between the magnetic pole faces opposed to each other of the permanent magnet and the electromagnet.

According to another aspect of the present invention, there is provided a polarization operation apparatus comprising a plurality of polarization rotation control section-wave plate pairs, each formed from a polarization rotation control section for rotationally controlling a polarization state of light and a wave plate disposed on the downstream side of the polarization rotation control section in a propagation direction of the light, and disposed in tandem along the propagation direction of the light, and a downstream side polarization rotation control section, provided on the downstream side in the propagation direction of light with respect to the plural polarization rotation control section-wave plate pairs, for rotationally controlling a polarization state of the light.

In this instance, three such polarization rotation control section-wave plate pairs may be disposed in tandem along the propagation direction of the light.

Each of the polarization rotation control sections which form the polarization rotation control section-wave plate pairs or the downstream side polarization rotation control section may include a Faraday rotation effect element for producing the Faraday rotation effect on the inputted light by means of a magnetic field, and an electromagnet for generating the magnetic field for producing the Faraday rotation effect on the Faraday rotation effect element.

At least one of the polarization rotation control sections which form the polarization rotation control section-polarization plate pairs and the downstream side polarization rotation control section may formed as the polarization controlling apparatus as claimed in any one of claims 1 to 15.

With the polarization controlling apparatus and the polarization operation apparatus, since the magnitude of the interaction magnetic field in the Faraday rotation effect element is varied by the magnetic field component generated by the electromagnet to vary the amount of the Faraday rotation effect to be had on the inputted light, high-speed operation can be achieved while increase of the power dissipation and increase of the apparatus scale are suppressed. Further, since such items as the magnetic force and the type of the permanent magnet, a spatial arrangement of components and so forth can be used as design parameters, a higher degree of freedom than that by the prior art can be obtained in design of the polarization controlling apparatus.

Further, more various polarization states than those by the prior art can be implemented with a high-speed response characteristic by control of driving current to the electromagnet to achieve an arbitrary polarization state by the polarization rotation control sections.

The above and other objects, features and advantages of the present invention will become apparent from the following description and the appended claims, taken in conjunction with the accompanying drawings.

BRIEF DESCRIPTION OF THE DRAWINGS

FIGS. 12 to 21 are schematic views showing modifications to the second embodiment of the present invention;

DESCRIPTION OF THE PREFERRED EMBODIMENTS

In the following, several embodiments of the present invention are described with reference to the drawings.

The above and other objects of the present invention described above and other technical subjects, means for solving the technical subject and operation and effects of the means will become apparent from the following disclosure of the preferred embodiments of the present invention described below.

A1. First Embodiment

Figure 1A:
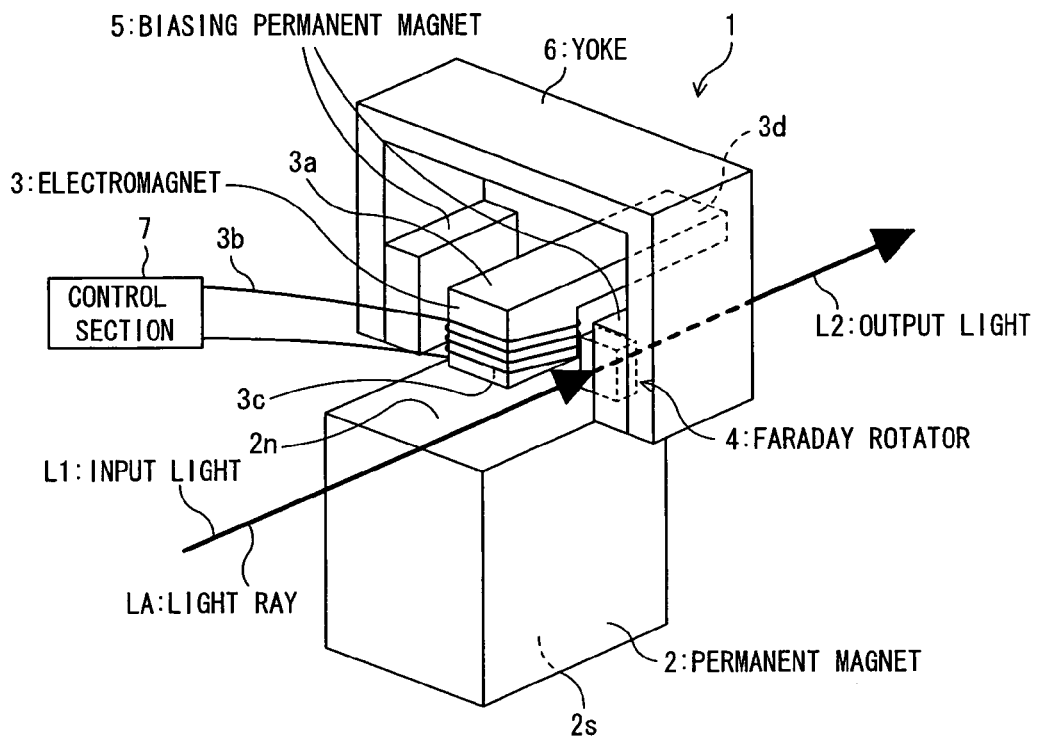
FIG. 1(a) is a schematic perspective view showing an example of a configuration of a polarization controlling apparatus according to a first embodiment of the present invention.

FIG. 1(a) is a schematic perspective view showing an example of a configuration of a polarization controlling apparatus according to a first embodiment of the present invention. Referring to FIG. 1(a), the polarization controlling apparatus 1 shown includes a permanent magnet 2, an L-shaped electromagnet 3 and a Faraday rotator 4, and further includes a pair of permanent magnets 5 for biasing and a yoke 6. The permanent magnet 2 may be a rare earth magnet such as, for example, a Nd magnet or a Sm—Co magnet, a ferrite magnet, an alnico magnet or a bond type magnet whose parent body is made of a high molecular material which contains permanent magnet powder made of any of the materials mentioned.

The electromagnet 3 includes an L-shaped core member 3a formed from, for example, a ferrite member, and a winding (coil) 3b formed from a conductor wound on one side of the L shape of the core member 3a. The magnitude of a magnetic field to be generated in an opening face direction of the winding 3b can be varied by varying the current to be supplied to the winding 3b.

Figure 2A:
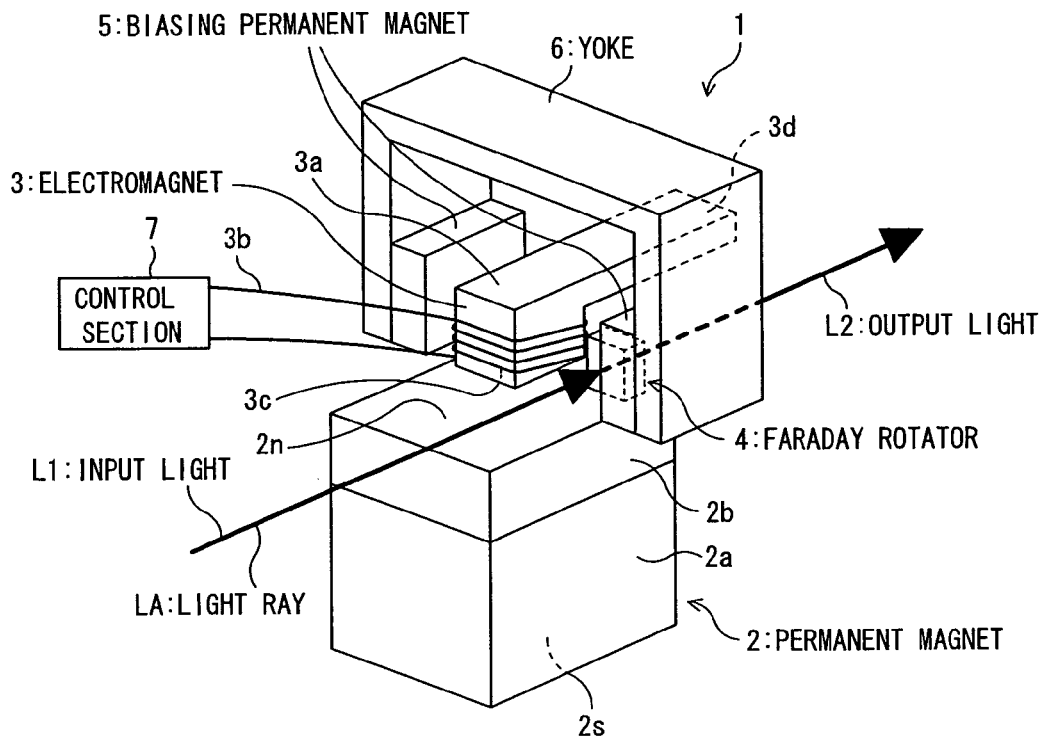
FIGS. 2(a) and 2(b) are schematic views showing a modification to the first embodiment of the present invention.
Figure 2B:
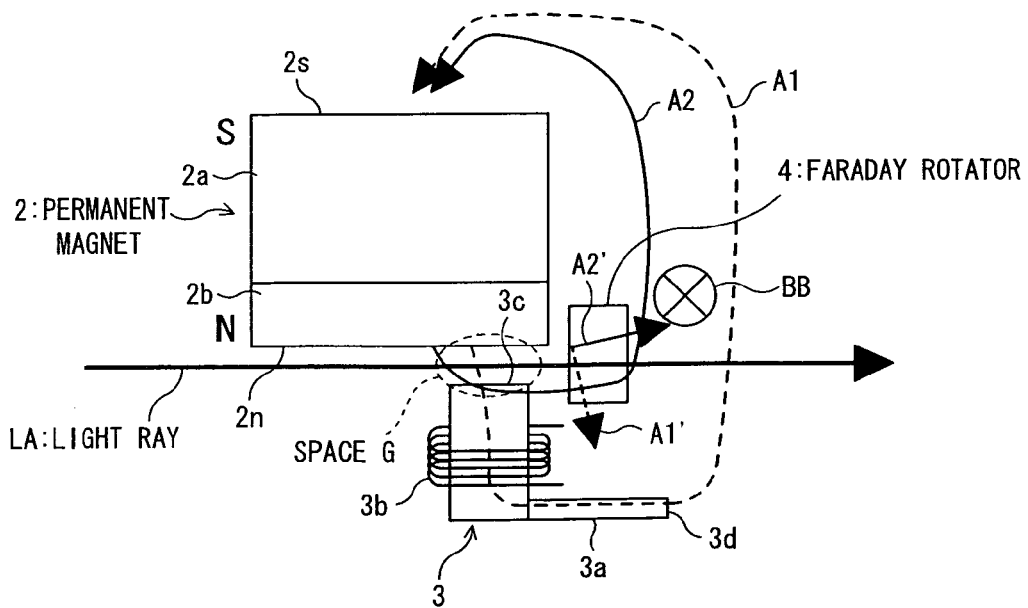

It is to be noted that, where a rare earth magnet is applied particularly to the permanent magnet 2 described above, a magnetizable part may be added to a magnetic pole of the rare earth magnet to form the permanent magnet 2. In this instance, as seen in FIGS. 2(a) and 2(b), the permanent magnet 2 can be formed from a permanent magnet member 2a and a pole piece 2b as a magnetizable part to a magnetic pole of the permanent magnet member 2a. A similar configuration can be applied also to the permanent magnet not only in the first embodiment but also in any other embodiment of the present invention.

Where the pole piece 2b is added to the permanent magnet member 2a which may be, for example, a rare earth magnet, the degree of variation of the magnitude of the magnetic field to be generated in the opening face direction of the winding 3b described above can be made higher than that where the permanent magnet member 2a by itself is used. Indeed also a material having a characteristic that the internal magnetization of a permanent magnet itself can be rotated readily is available, where a pole piece is added to and considered as part of a permanent magnet, also another material with which the magnetization in the inside of the permanent magnet (in the inside of the pole piece) can be rotated readily is available. In this instance, where the magnetization can be rotated readily, the variation of an interaction magnetic field formed by an interaction between the magnetic field generated by the electromagnet 3 and the magnetic field generated by the permanent magnet 2 can sometimes be made greater.

It is to be noted that the pole piece described above may be made of iron, an alloy containing iron, ferrite, a material made of an insulator such as a high polymer substance or a ceramic in which fine particles of iron or an alloy containing iron are dispersed.

Further, the opening face of the winding 3b (face along which a magnetic field is generated when current flows through the winding 3b) is disposed so as to be opposed to an opposed magnetic pole face 2n which forms one of magnetic poles of the permanent magnet 2 (N pole in the first embodiment). In particular, by varying the current to be supplied to the winding 3b, the magnetic pole face 3c of the electromagnet 3 opposed to the permanent magnet 2 can be made a pole (N pole) same as that of the opposed magnetic pole face 2n of the permanent magnet 2 or another pole (S pole) opposite to that of the opposed magnetic pole face 2n of the permanent magnet 2.

It is to be noted that, in the first embodiment, in order to rotate the polarization of input light L1 by a Faraday rotation effect as hereinafter described, an interaction magnetic field formed by an interaction between the magnetic field generated by the electromagnet 3 and the magnetic field generated by the permanent magnet 2 is used as the magnetic field to be given along an optical axis LA of the input light L1. This eliminates the necessity to excessively increase the current to be supplied to the winding 3b of the electromagnet 3 in order to assure a dynamic range for the polarization rotation angle or to increase the number of turns of the winding 3b to such a degree that the response speed may be subject to some obstacle.

Further, the Faraday rotator 4 is a Faraday rotation effect element which is disposed at a position at which the interaction magnetic field described above acts upon the Faraday rotator 4 and exerts a Faraday rotation effect on the input light L1 by the interaction magnetic field described above. For the Faraday rotator 4, an iron garnet material such as Y (yttrium) iron garnet or Bi-substituted iron garnet can be used.

In determination of the position at which the Faraday rotator 4 is disposed, the Faraday rotator 4 is disposed at a position at which a magnetic field in a direction substantially parallel to a plane sandwiched between the opposed magnetic pole faces 2n and 3c of the permanent magnet 2 and the electromagnet 3 acts as the interaction magnetic field. In the polarization controlling apparatus 1 according to the first embodiment, the optical axis LA of the input light L1 which is an object of polarization control includes the plane sandwiched between the opposed magnetic pole faces 2n and 3c described above, and also the Faraday rotator 4 is disposed on the optical axis LA of the input light L1.

In other words, the Faraday rotator 4 is disposed at a position on the optical axis LA in the proximity of the opposed magnetic pole faces 2n and 3c so that it may be acted upon by a magnetic field in a direction along the optical axis LA (at least in a direction same as or opposite to the propagation direction of the input light L1) by an interaction including a variation in magnetic resistance at the electromagnetic core portion appearing in the proximity of the opposed magnetic pole faces 2n and 3c described hereinabove. In the first embodiment, the Faraday rotator 4 is disposed at a position in the proximity of the opposed magnetic pole faces 2n and 3c on an extension line of the optical axis LA of the input light L1 which passes through the space between the opposed magnetic pole faces 2n and 3c.

Consequently, if the input light L1 of an object of polarization control enters the Faraday rotator 4 along the optical axis LA, then it passes through the Faraday rotator 4 and is emitted as output light L2. At this time, the polarization state of the input light L1 is rotated by an expected amount of rotation by a Faraday rotation effect by the interaction magnetic field of the permanent magnet 2 and the electromagnet 3 to produce the output light L2 described above.

Meanwhile, the biasing permanent magnets 5 in pair provide a magnetic field (preferably a saturating magnetic field for the Faraday rotator) in a substantially perpendicular direction to the interaction magnetic field of the permanent magnet 2 and the electromagnet 3 along the optical axis LA and to the optical axis LA of the input light L1 incident to the Faraday rotator 4 in order to reduce the possible loss upon polarization control of the input light L1. In other words, the biasing permanent magnets 5 provide a magnetic field to magnetize the Faraday rotator 4 into a magnetically saturated state in a direction substantially perpendicular to an effective magnetic field component (along the optical axis LA) which provides the Faraday rotation effect irrespective of whether the current to the electromagnet 3 is on or off.

To this end, the biasing permanent magnets 5 can be disposed on the opposite sides with respect to the Faraday rotator 4 as viewed from the direction of the optical axis LA. Also the biasing permanent magnets 5 may be formed from a material same as that of the permanent magnet 2 described hereinabove. It is to be noted that the yoke 6 is formed from a soft ion plate or made of ferrite for preventing deterioration of the magnetic field of the biasing permanent magnets 5. The yoke 6 supports saturation of the magnetic field component in the perpendicular direction to the optical axis LA of the input light L1.

Accordingly, the biasing permanent magnets 5 and the yoke 6 described above construct a bias magnetic field application section for applying a bias magnetic field for magnetizing the yoke 6 into a saturated state in a direction perpendicular to the interaction magnetic field formed by the permanent magnet 2 and the electromagnet 3. Further, the bias magnets may be formed otherwise from such a donut-shaped magnet having a gap as shown in FIG. 12 without using the yoke 6.

Further, a control section 7 controls the direction and the magnitude of the current to be supplied to the winding 3b described hereinabove. Consequently, the magnetic field component to be generated by the electromagnet 3 can be variably controlled in response to the amount of the Faraday rotation effect (amount of rotation of polarization of the input light L1) to be exerted on the input light L1.

In the polarization controlling apparatus 1 according to the first embodiment having the configuration described above, the magnitude and the direction of the magnetic field in the direction of the optical axis LA of the input light L1 incident to the Faraday rotator 4 can be varied by controlling the current to be supplied to the winding 3b which composes the electromagnet 3. Consequently, the polarization rotation amount of the input light L1 by the Faraday rotation effect can be controlled.

Figure 1B:
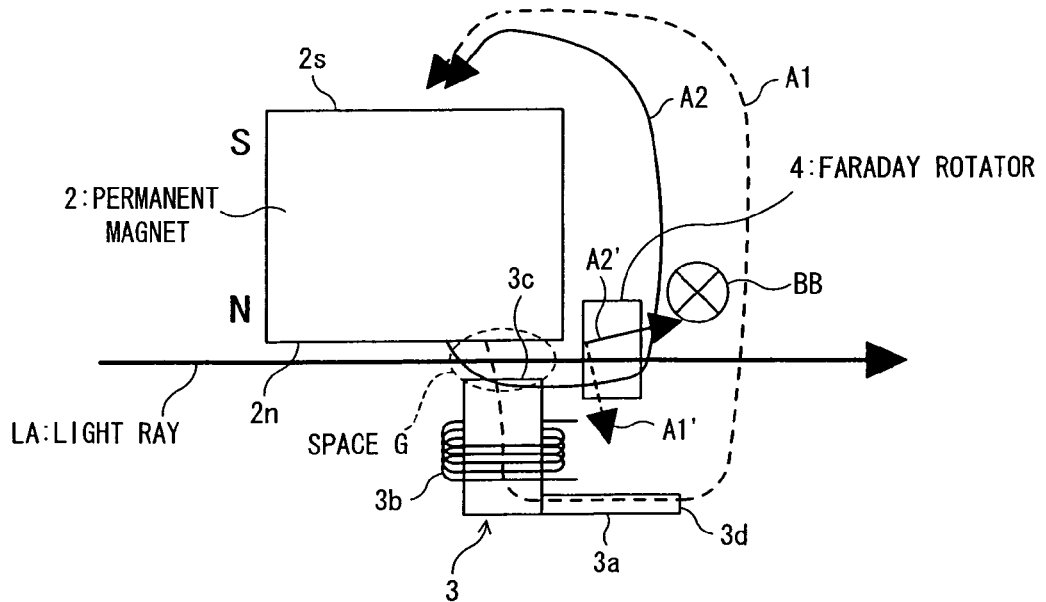
FIG. 1(b) is a schematic view illustrating a variation of a magnetic field in accordance with a variation of current to be supplied to a winding in the polarization controlling apparatus of the first embodiment.

FIG. 1(b) illustrates a variation of the magnetic field caused by a variation of electric current to be supplied to the winding 3b described hereinabove in the polarization controlling apparatus 1 according to the first embodiment, and is a view of the polarization controlling apparatus 1 as viewed in a direction from a side in FIG. 1(a). Where the direction of the magnetic pole provided by the electromagnet 3 with current flowing through the electromagnet 3 and the direction of the magnetic pole generated by the permanent magnet 2 have a relationship that they are same as each other through control of the direction and the magnitude of the current of the winding 3b by the control section 7, or where no current is supplied to the electromagnet 3, the magnetic resistance between the electromagnet 3 and the permanent magnet 2 is comparatively low, and most part of magnetic fluxes generated by the permanent magnet 2 flow throuth the core member 3a of the electromagnet 3 which has a high magnetic permeability. Therefore, in this instance, the magnetic flux distribution in the direction of an arrow mark A1 of a broken line in FIG. 1(b) is high in the Faraday rotator 4. It is to be noted that, in FIG. 1(b), reference character BB denotes the direction of the magnetic field by the permanent magnet 5.

In particular, as shown in FIG. 1(b), the polarity of the opposed magnetic pole face 2n of the permanent magnet 2 to the electromagnet 3 is the N pole, and most part of magnetic fluxes generated by the permanent magnet 2 flows through the magnetic pole face 3c of the electromagnet 3. Therefore, the electromagnet 3 is induced such that the magnetic pole face 3c of the electromagnet 3 has the S polarity while the magnetic pole 3d at the other end of the electromagnet 3 which is not the magnetic pole face 3c has the N polarity. Consequently, the distribution magnetic fluxes in the direction of the arrow mark A1 directed from the magnetic pole 3d at the other and of the electromagnet 3 toward the magnetic pole (S pole) 2s at the other end of the permanent magnet 2 which is not the opposed magnetic pole face 2n increases.

In this instance, since the magnetic field components in the direction along the optical axis LA of the incident input light L1 in the Faraday rotator 4 become comparatively little (refer to the direction A1' of magnetic fluxes which pass through the Faraday rotator 4), the Faraday rotation effect which the light L1, L2 which passes through the Faraday rotator 4 undergoes is comparatively little.

On the other hand, where the direction of the magnetic pole of the electromagnet 3 formed by current flowing through the electromagnet 3 and the direction of the magnetic pole generated by the permanent magnet 2 have a relationship that they are opposite to each other through control of the direction and the magnitude of the current of the winding 3b by the control section 7, the magnetic resistance between the electromagnet 3 and the permanent magnet 2 is high, and the ratio of magnetic fluxes of the permanent magnet 2 which pass through the core member 3a of the electromagnet 3 is low while magnetic fluxes which are directed to the outside of the space G sandwiched between the opposed magnetic pole faces 2n and 3c appear. Therefore, in this instance, the magnetic fluxes in the direction of an arrow mark A2 of a solid line in FIG. 1(b) are applied to the Faraday rotator 4.

At this time, among magnetic fluxes which are generated as a result of increase of the magnetic resistance between the electromagnet 3 and the permanent magnet 2 and directed to the outside of the space G sandwiched between the opposed magnetic pole faces 2n and 3c, those magnetic fluxes which extend along the optical axis LA of the input light L1 of an object of polarization rotation are much (refer to the magnetic flux direction A2' of those magnetic fluxes which pass through the Faraday rotator 4). If the magnetic field formed from such magnetic fluxes which are directed to the outside of the space G as just described is used as a magnetic field (interaction magnetic field) produced by an interaction between the electromagnet 3 and the permanent magnet 2, then the polarization state of the input light L1 can be rotated. In this instance, rotation of the polarization state of the input light L1 incident to the Faraday rotator 4 is controlled by the magnitude of the magnetic field in the magnetic flux direction A2', and the input light L1 having the rotated polarization state passes through the Faraday rotator 4 and is outputted from the Faraday rotator 4.

In this manner, with the polarization controlling apparatus 1 according to the first embodiment of the present invention, the magnitude and the direction of the interaction magnetic field in the Faraday rotator 4 can be varied by magnetic field components generated by the electromagnet 3 to vary the amount of the Faraday rotation effect to be exerted on the inputted light. Therefore, high-speed operation can be achieved and increase of the power dissipation and increase of the apparatus scale can be suppressed, and the degree of freedom in design can be enhanced when compared with that in the case of the prior art. In other words, since such items as the magnetic force and the type of the permanent magnet 2, a spatial arrangement of components and so forth can be used as design parameters, a higher degree of freedom can be obtained in design of the polarization controlling apparatus 1.

For example, since the varying magnetic field by which a Faraday rotation effect is generated is formed from the interaction magnetic field which varies in response not only to the magnetic field generated by the electromagnet 3 but also to an interaction between the magnetic field of the electromagnet 3 and a magnetic field component provided by the permanent magnet 2, the degree of freedom in design of the direction of the magnetic field variation to be set to the direction of the optical axis increases when compared with that in the case of the prior art wherein a magnetic field component generated by the electromagnet 3 is used directly for a Faraday rotation effect. Consequently, the degree of freedom in apparatus design when a magnetic component applying equipment is added to an optical system to form a polarization controlling apparatus can be enhanced.

Further, the degree of freedom that the variation of the magnetic flux vector distribution of the permanent magnet 2 can be utilized in order to vary the magnetic field component in the direction of the optical axis of the input light L1 by varying the magnetic flux vector distribution of the permanent magnet 2 by the magnetic field of the electromagnet 3 can be added newly. Consequently, it can be anticipated to obtain a greater magnetic field variation than that in the case wherein the amount of polarization rotation of light is controlled merely by the magnetic field variation of the electromagnet 3 as in the prior art. Therefore, increase of the dynamic range of the amount of polarization rotation can be anticipated.

Furthermore, since, in order to rotate the polarization state of input light L1 by a Faraday rotation effect, an interaction magnetic field formed by an interaction between the magnetic field generated by the electromagnet 3 and the magnetic field generated by the permanent magnet 2 is used as the magnetic field to be given along the optical axis LA of the input light L1, the necessity to excessively increase the current to be supplied to the winding 3b of the electromagnet 3 or increase the number of turns of the winding 3b to such a degree that some problem occurs with the speed of response in order to assure the dynamic range of the angle of polarization rotation as in the case of the prior art is mitigated. Also from this, such a restriction to the degree of freedom in design of an apparatus as appears in the prior art can be eliminated.

Figure 3:
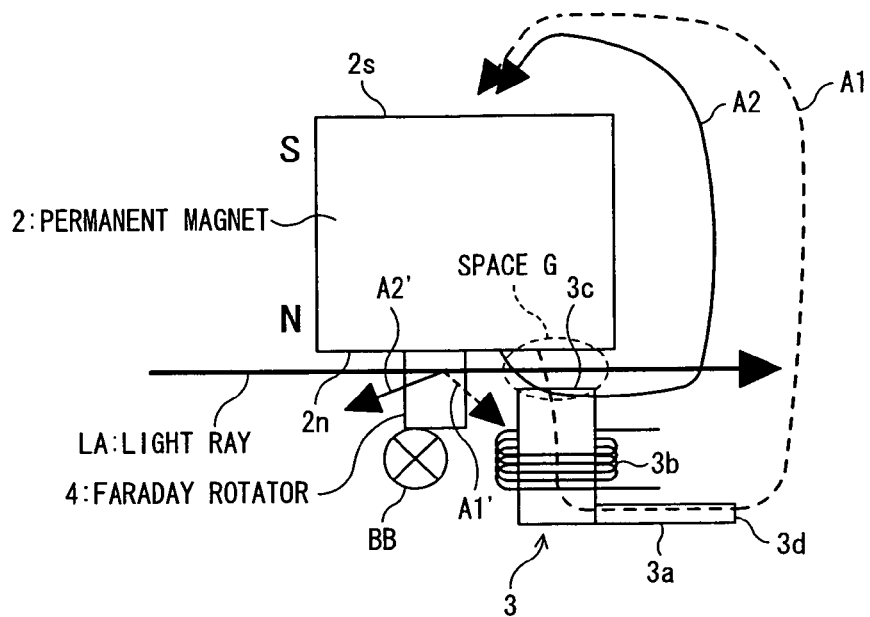
FIGS. 3 to 8 are schematic views showing different modifications to the first embodiment of the present invention.

It is to be noted that, while, in the first embodiment described hereinabove, as the position at which the Faraday rotator 4 is disposed, the Faraday rotator 4 is disposed at a position on the downstream side with respect to the positions of the opposed magnetic pole faces 2n and 3c of the permanent magnet 2 and the electromagnet 3 with regard to the propagation direction of the input light L1, according to the present invention, the position of the Faraday rotator 4 is not limited to this. In particular, for example, the Faraday rotator 4 may be disposed at another position which is on the upstream side with respect to the positions of the opposed magnetic pole faces 2n and 3c of the permanent magnet 2 and the electromagnet 3 with regard to the propagation direction of the input light L1 as seen in FIG. 3 only if the magnetic field in a direction substantially parallel to a plane sandwiched between the opposed magnetic pole faces 2n and 3c of the permanent magnet 2 and the electromagnet 3 acts upon the Faraday rotator 4 at the position. It is to be noted that, in FIG. 3, like reference characters denote substantially like elements to those of FIG. 1(b).

A2. First Modification to the First Embodiment

Figure 4:
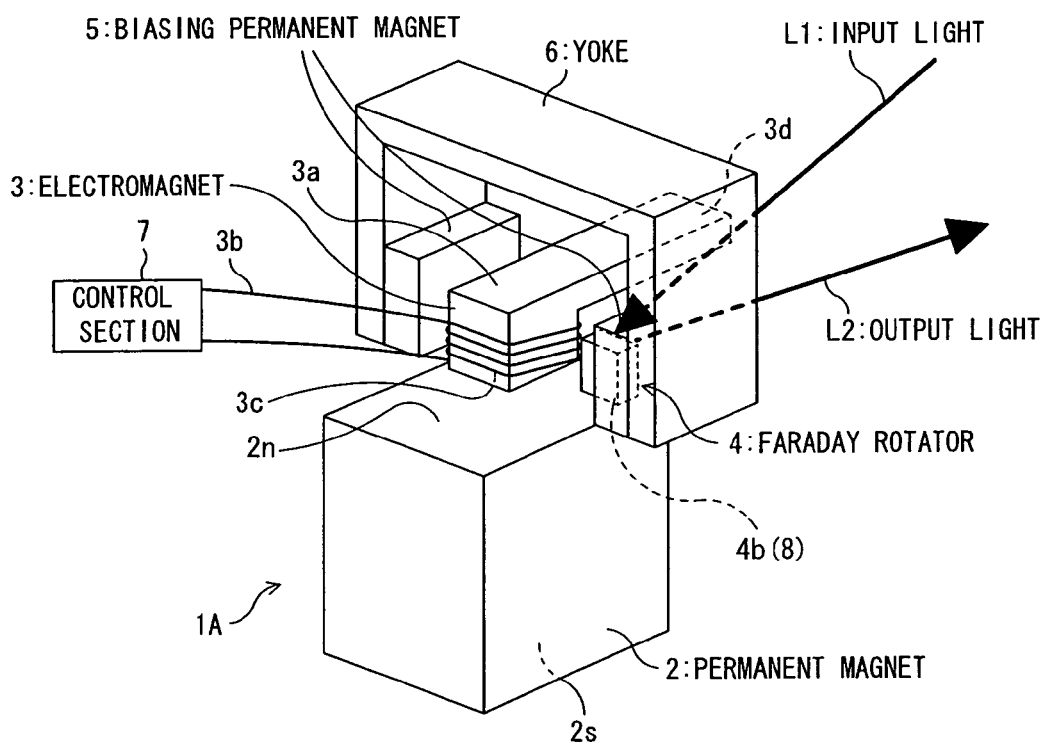
Figure 5:
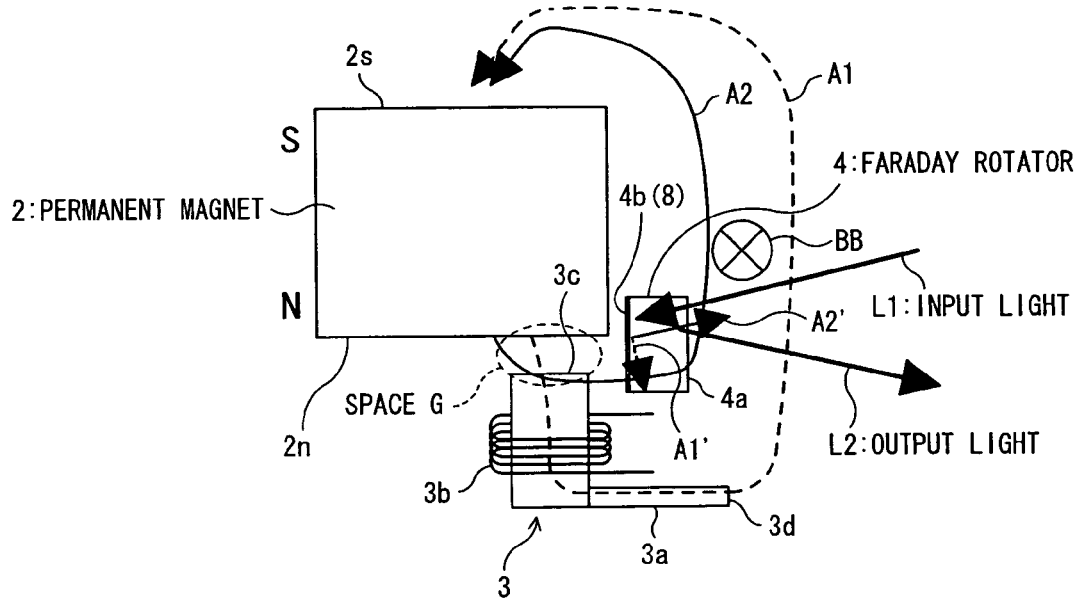

FIG. 4 is a schematic perspective view showing a polarization controlling apparatus 1A according to a first modification to the first embodiment of the present invention, and FIG. 5 is a view illustrating a relationship between the magnetic field variation in response to the variation of current to be supplied to the winding 3b and the optical axes of input and output lights in the polarization controlling apparatus 1A shown in FIG. 4 and is a view of the polarization controlling apparatus 1A as viewed in a direction from a side in FIG. 4. While the polarization controlling apparatus 1A shown in FIG. 4 is different in the mode of introduction of input light of an object of polarization control and the outputting mode of output light whose polarization is controlled, the configuration of the remaining part of the polarization controlling apparatus 1A is basically same as that in the first embodiment described above. It is to be noted that, in FIGS. 4 and 5, like reference characters denote substantially like elements to those of FIGS. 1(a) and 1(b).

Referring to FIG. 4, the polarization controlling apparatus 1A shown is different from the polarization controlling apparatus 1 of the first embodiment described above in that a reflecting member 8 for reflecting the input light L1 is formed on a face 4b of the Faraday rotator 4 remote from a face 4a of the Faraday rotator 4 into which the input light L1 is introduced. Then, as seen in FIGS. 4 and 5, when the input light L1 is introduced into the Faraday rotator 4 from the side of the L-shape of the core member 3a on which the winding 3b is not wound, that is, from the interior side in FIG. 4, the input light L1 is reflected by the reflecting member 8 formed on the face 4b of the Faraday rotator 4 remote from the face 4a and is emitted as output light L2 from the face 4a.

At this time, since the permanent magnet 2 and the electromagnet 3 provide an interaction magnetic field similar to that in the case of the first embodiment described hereinabove to the Faraday rotator 4, the Faraday rotator 4 rotates the polarization state of the input light in response to the magnitude of the interaction magnetic field in the direction along the optical axis, and the rotated polarized light is emitted as output, light through the face 4a.

Accordingly, also in the polarization controlling apparatus 1A according to the first modification to the first embodiment, polarization rotation control can be performed with the interaction magnetic field of the permanent magnet 2 and the electromagnet 3, and consequently, advantages similar to those of the first embodiment described hereinabove can be achieved. Further, since the length of the optical path in the Faraday rotator 4 by which polarization rotation is performed can be increased to substantially twice that in the case of FIG. 1(a). Consequently, increase of the dynamic range of the polarization rotation control and polarization rotation control by efficient current supply can be anticipated.

Figure 6:
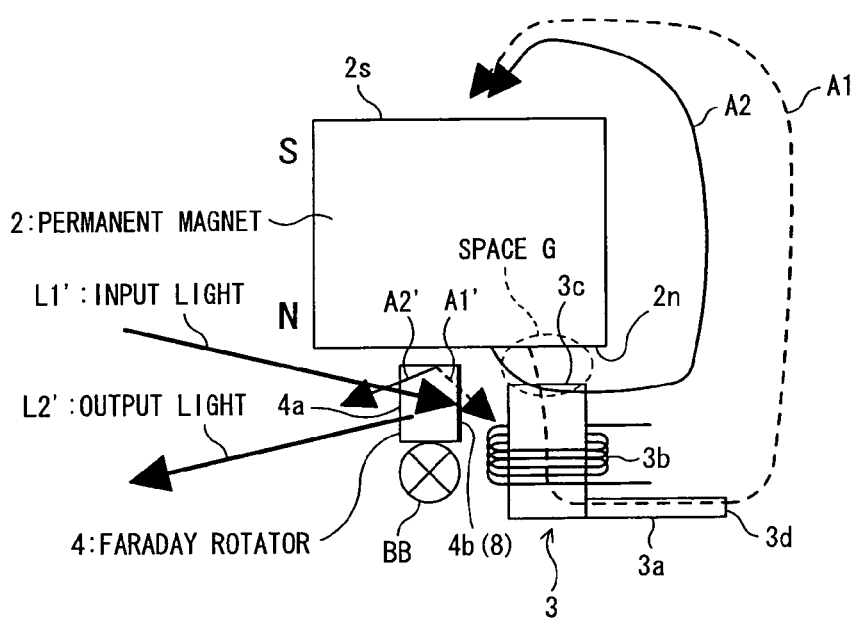

It is to be noted that, while, in the arrangement described above with reference to FIGS. 4 and 5, the Faraday rotator 4 on which the reflecting member 8 is formed is provided on that side of the L shape of the core member 3a on which the winding 3b is not wound, that is, on the interior side in FIG. 4 with respect to the opposed magnetic pole faces 2n and 3c, the position at which the Faraday rotator 4 is disposed is not limited to this. In particular, for example, as shown in FIG. 6, the Faraday rotator 4 may be disposed at a position remote from the location in the case of FIGS. 4 and 5 with respect to the space G sandwiched between the opposed magnetic pole faces 2n and 3C. In this instance, the input light L1 comes in through the face 4a, which is the opposite side, that is, this side, remote from the interior side in FIG. 4 and is reflected by the reflecting member 8 provided on the face 4b remote from the face 4a. Consequently, the output light L2 after polarization controlled is outputted through the face 4a. It is to be noted that, in FIG. 6, like reference characters denote substantially like elements to those of FIGS. 4 and 5. Further, the bias magnet may be formed from such a donut-shaped magnet having a gap as shown in FIG. 12 without using the yoke 6.

A3. Second Modification to the First Embodiment

Figure 7:
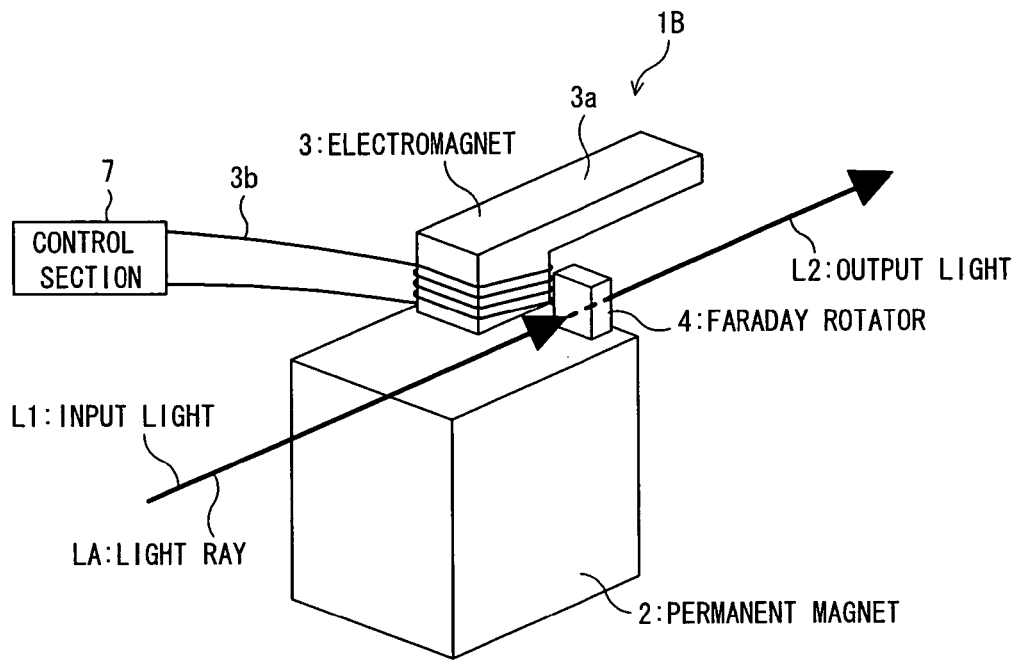
Figure 8:
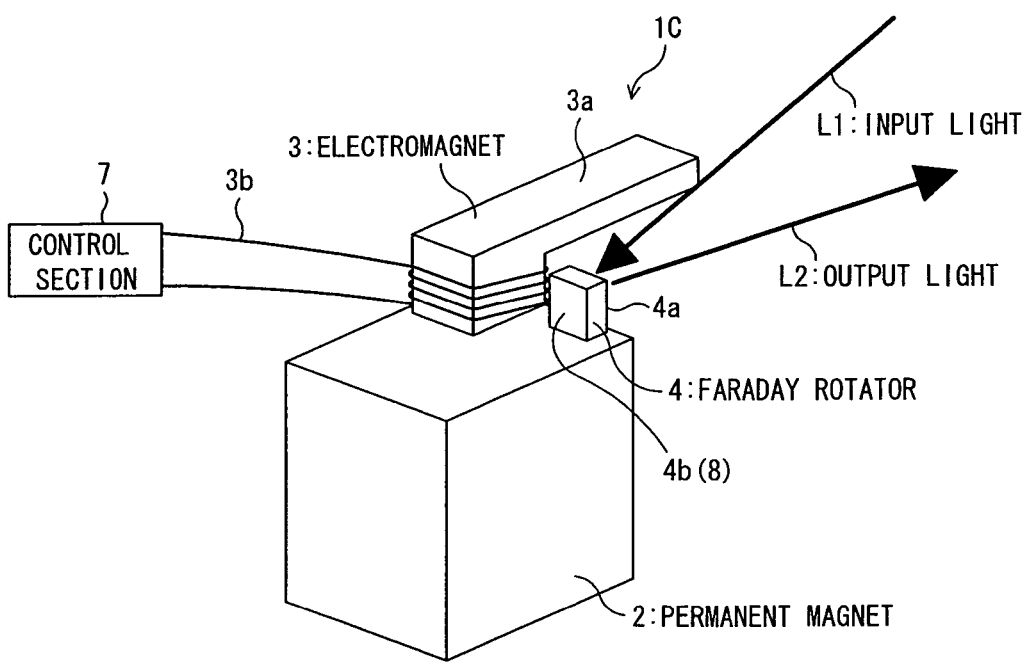

The polarization controlling apparatus 1 described hereinabove with reference to FIG. 1(a) or the polarization controlling apparatus 1A described hereinabove with reference to FIG. 4 may be modified otherwise such that the biasing permanent magnets 5 and the yoke 6 are omitted as in the case of a polarization control apparatus 1B or 1C shown in FIG. 7 or 8. Also with the polarization control apparatus 1B or 1C, the polarization state of the input light L1 can be rotated by a Faraday rotation effect by the direction of the magnetic field formed by an interaction at least between the direction of the magnetic field formed by the electromagnet 3 and the direction of the magnetic field formed by the permanent magnet 2, and the light in the rotated polarization state can be outputted as the output light L2. Consequently, advantages similar to those achieved by the first embodiment described above can be achieved.

A4.

While, in the first embodiment and the modifications described above, the region sandwiched by the opposed magnetic pole faces 2n and 3c of the permanent magnet 2 and the electromagnet 3 is formed as the space G, some other known substance whose relative permeability in an unsaturated state is 10 or less may be interposed between the opposed magnetic pole faces 2n and 3c of the permanent magnet 2 and the electromagnet 3.

B1. Second Embodiment

Figure 9:
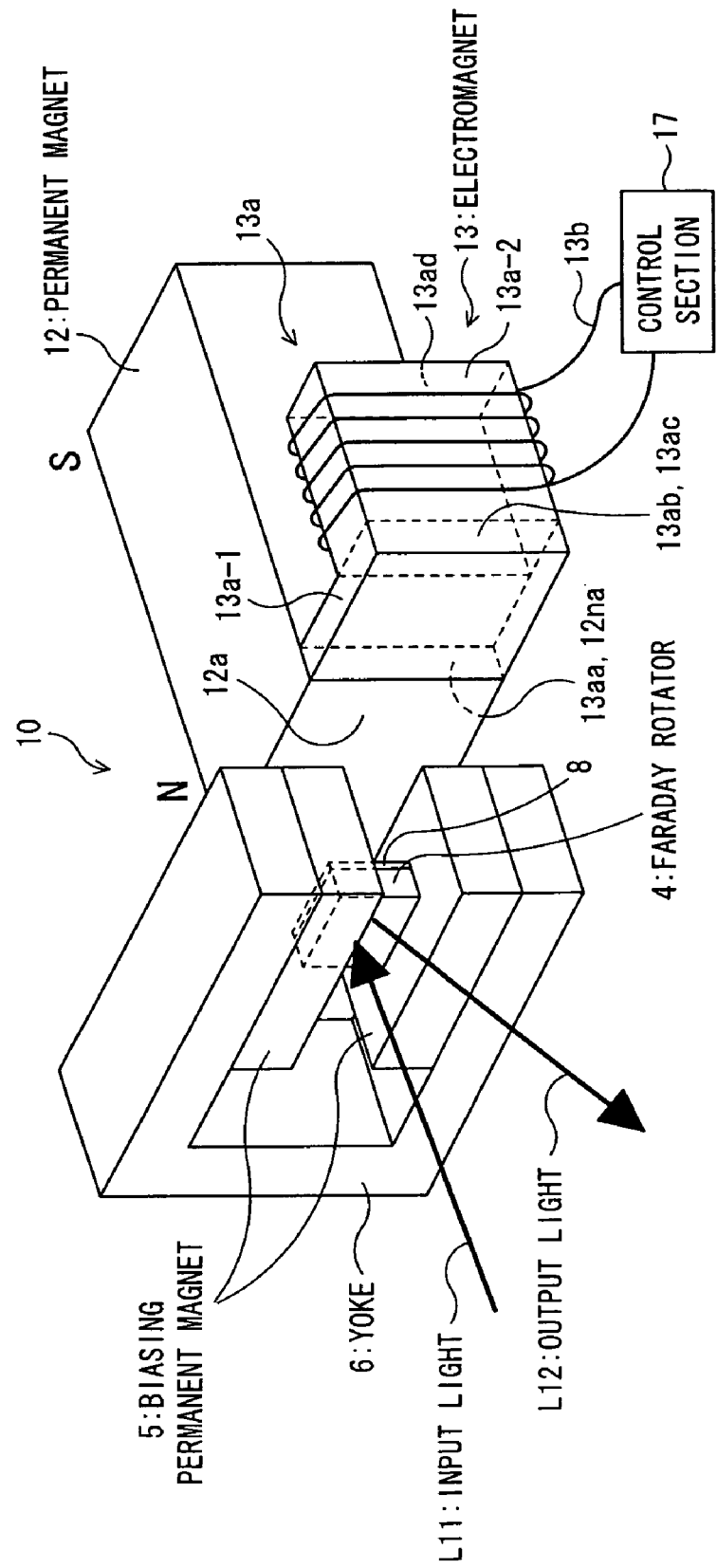
FIG. 9 is a schematic perspective view showing an example of a configuration of a polarization controlling apparatus according to a second embodiment of the present invention.
Figure 10:
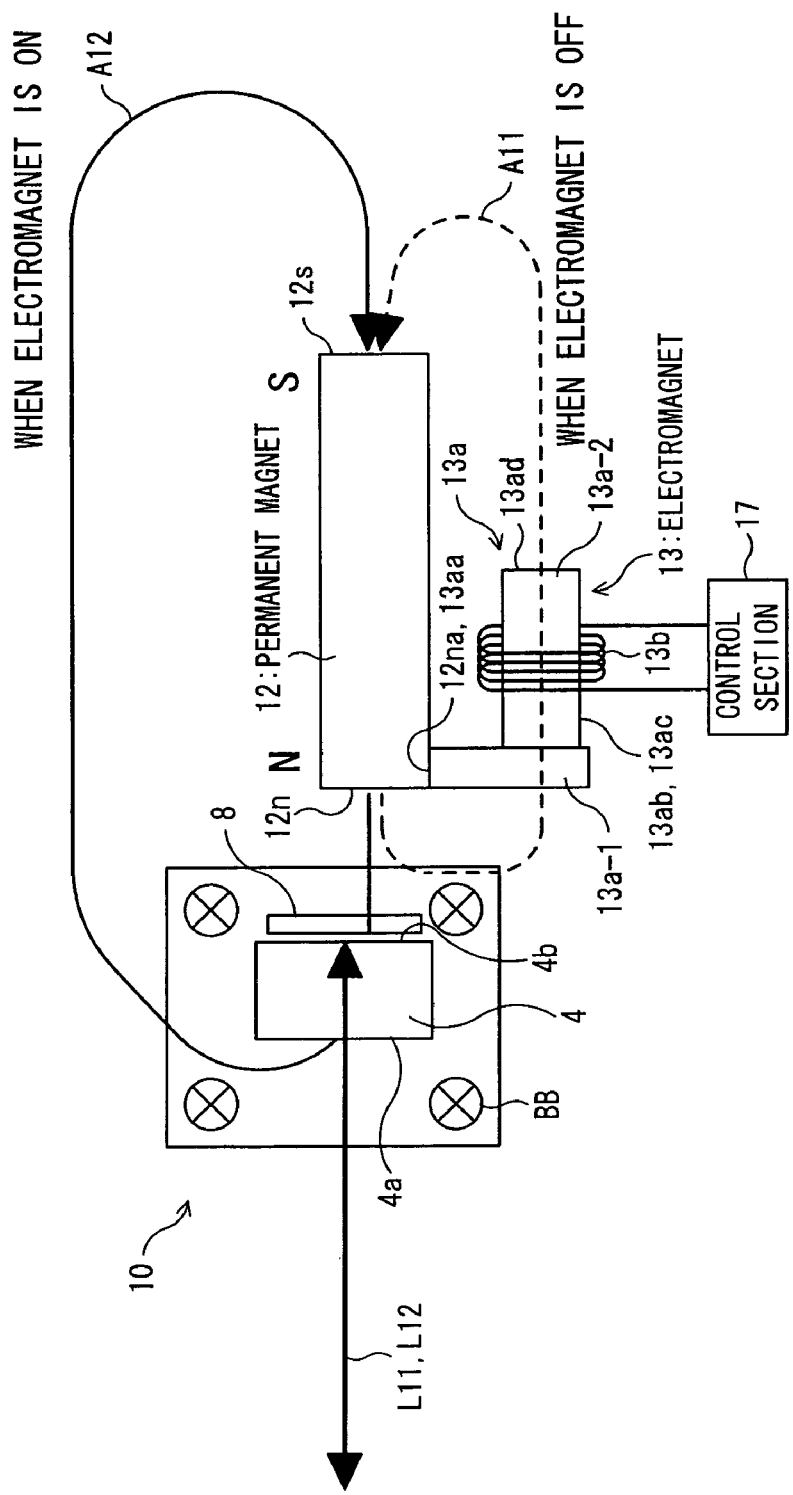
FIG. 10 is a schematic view illustrating a variation of a magnetic field in accordance with a variation of current to be supplied to a winding in the polarization controlling apparatus of the second embodiment.

FIG. 9 is a schematic perspective view showing an example of a configuration of a polarization control apparatus 10 according to a second embodiment of the present invention, and FIG. 10 is a schematic view illustrating a variation of a magnetic field in response to a variation of current to flow through a winding 13b of an electromagnet 13 in the polarization control apparatus 10 according to the second embodiment and is a view showing the polarization control apparatus 10 as viewed in a direction from above in FIG. 9.

Referring first to FIG. 9, the polarization control apparatus 10 shown includes a permanent magnet 12, an L-shaped electromagnet 13 and a control section 17 disposed in different arrangement from that of the first embodiment described hereinabove. The polarization control apparatus 10 further includes a Faraday rotator 4 having a reflecting member 8 formed on a face 4b thereof, a pair of biasing permanent magnets 5 and a yoke 6. The permanent magnet 12 may be made of a material similar to that in the case of the first embodiment described hereinabove.

The polarization control apparatus 10 according to the second embodiment is different from the polarization controlling apparatus 1 of the first embodiment described hereinabove with reference to FIG. 4 in an arrangement relationship of the permanent magnet 12, electromagnet 13 and Faraday rotator 4.

Thus, due to the difference in the arrangement relationship of the permanent magnet 12 and the electromagnet 13, also the manner of generation of an interaction magnetic field formed by an interaction between magnetic fields generated by the permanent magnet 12 and the electromagnet 13 (that is, acting upon the Faraday rotator 4) is different from that in the first embodiment described hereinabove. It is to be noted, however, that the configuration of any other portion is basically similar to that in the first embodiment described hereinabove. It is to be noted that, in FIG. 9, like reference characters denote substantially like elements to those of FIG. 4.

The electromagnet 13 includes a core member 13a formed from a ferrite member or the like and further includes a winding 13b, and can vary the magnitude and the direction of a magnetic field to be generated thereby by varying the direction and the magnitude of current to be supplied to the winding 13b. Further, the electromagnet 13 has an L shape similar to that (refer to reference character 3a) in the first embodiment described hereinabove, and includes a first core portion 13a-1 and a second core portion 13a-2 which correspond to the two sides of the L shape.

The first core portion 13a-1 contacts at one end thereof with a magnetic pole, for example, the N pole, of the permanent magnet 12. In FIG. 9, an end face at an end portion 13aa of the first core portion 13a-1 contacts with or is adhered to a side face end portion 12na of the permanent magnet 12 in the proximity of a permanent magnet end face 12n of the N pole using a bonding adhesive or a jig in the form of a retainer band. Further, the second core portion 13a-2 is disposed such that the other end portion 13ab of the first core portion 13a-1 is connected to an end portion 13ac of the second core portion 13a-2 and the other end portion 13ad of the second core portion 13a-2 is positioned closely to the other magnetic pole, for example, the S pole, of the permanent magnet 12. The winding 13b is provided on the second core portion 13a-2. It is to be noted that, in the present embodiment, the first core portion 13a-1 and the second core portion 13a-2 are preferably formed as a unitary member.

When current flows through the winding 13b, the opposite end portions 13aa and 13ad of the core member 13a serve as the N and S poles and form a magnetic field in a direction along the L-shaped core member 13a. At this time, where attention is paid to the one end portion 13aa at which the first core portion 13a-1 contacts with one end of one (N pole) of the magnetic poles of the permanent magnet 12, the one end portion 13aa can be magnetized to a pole (N pole) same as or another pole (S pole) opposite to the magnetic pole with which the one end portion 13aa contacts by varying the current (including a case wherein the current is zero) to be supplied to the winding 13b. By reversing the magnetic pole to be formed by the electromagnet 13 in this manner, the magnetic field formed by an interaction between the permanent magnet 12 and the electromagnet 13 can be varied as hereinafter described.

Incidentally, the Faraday rotator 4 is disposed in the proximity of one or the other of the electrodes of the permanent magnet 12 (in the second embodiment, the N pole which is the one magnetic pole). Thus, the magnetic field component to be generated by the electromagnet 13 with the current to be supplied to the winding 13b is variably controlled to vary the magnitude of the magnetic field which exerts a Faraday rotation effect on the input light L1 inputted to the Faraday rotator 4 and the reflected light L2, that is, the interaction magnetic field formed by an interaction between the permanent magnet 12 and the electromagnet 1, thereby to vary the amount of the Faraday rotation effect exerted on the light L1, L2.

Further, the reflecting member 8 is disposed on a face of the Faraday rotator 4 opposing to the permanent magnet end face 12n of the permanent magnet 12. Consequently, if input light L11 is inputted from the side remote from the location of the permanent magnet 12 to the face 4a of the Faraday rotator 4, then it is reflected by the reflecting member 8 formed on the face 4b remote from the face 4a and emitted as output light L12 through the face 4a.

Figure 11A:
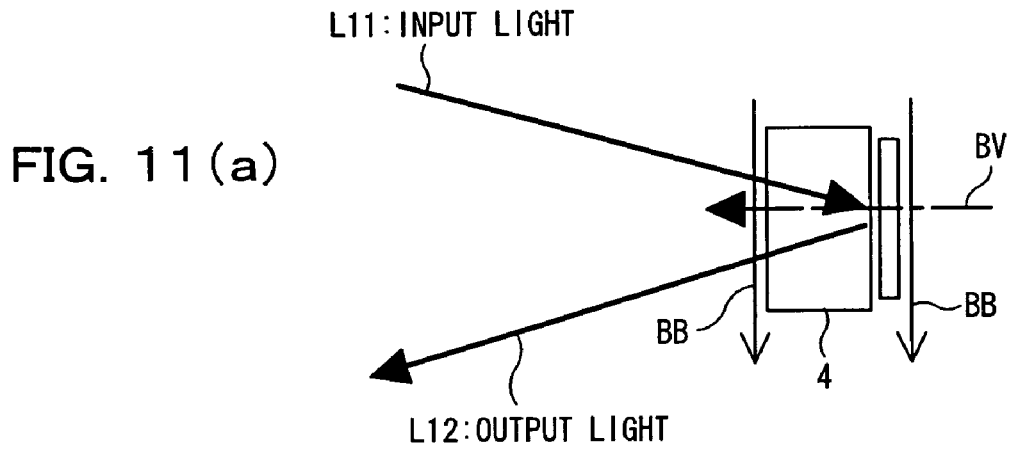
FIGS. 11(a) to 11(c) are schematic views illustrating optical axis angles of input light and output light together with an effective magnetic field component for a Faraday rotation effect and a bias magnetic field component.
Figure 11B:
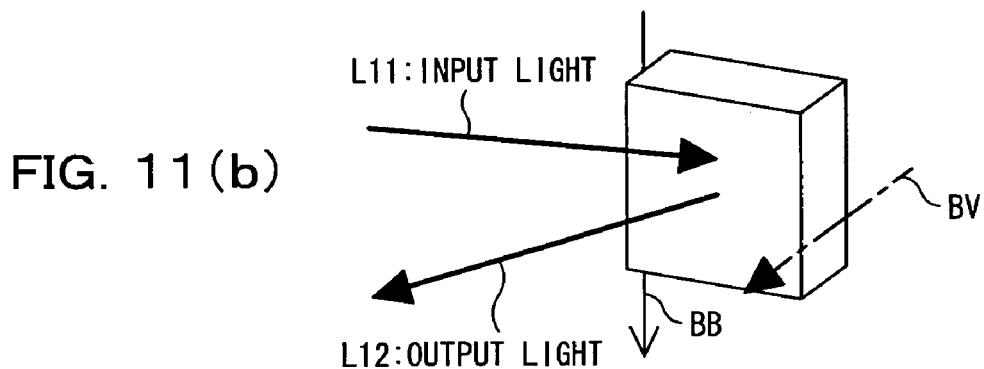
Figure 11C:
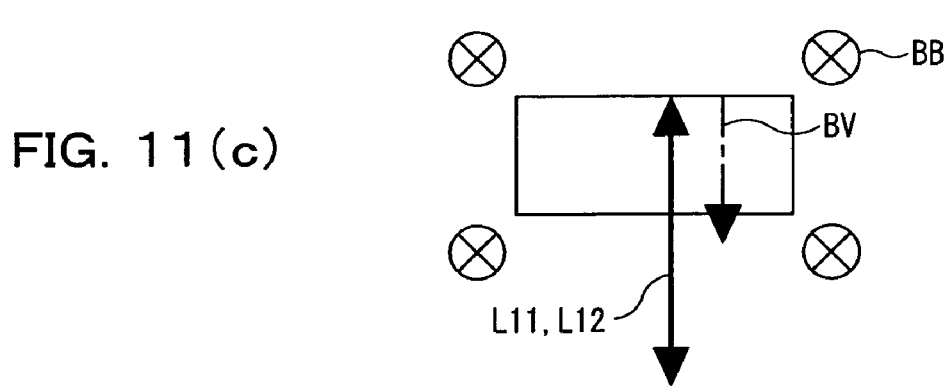

It is to be noted that FIGS. 11(a) to 11(c) illustrate the angles of the optical axes of the input light L11 incident to the face 4a of the Faraday rotator 4 and the output light L12 reflected by the reflecting member 8 and emerging through the face 4a together with the directions of an effective magnetic field component BV for a Faraday rotation effect and a bias magnetic field component BB by the biasing permanent magnets 5. In particular, FIG. 11 (a) is a view as viewed in a direction from a side in FIG. 9; FIG. 11(b) is a view as viewed in an oblique direction similarly to FIG. 9; and FIG. 11(c) is a view as viewed in a direction from above in FIG. 9.

As seen from FIGS. 11(a) to 11(c), the optical axes of the input light L11 and the output light L12 are included in one plane almost perpendicular to the permanent magnet end face 12n of the permanent magnet 12, and the effective magnetic field component BV acts so as to exert a Faraday rotation effect on the lights L11 and L12. In other words, an optical path in the Faraday rotator 4 for polarization rotation is formed as a double-trip optical path by the reflecting member 8 interposed therein.

Further, the biasing permanent magnets 5 in pair shown in FIG. 9 provide a magnetic field (preferably a saturating magnetic field) substantially in a perpendicular direction as seen in FIG. 9 or FIGS. 10 and 11(a) to 11(c) with respect to the optical axes of the input light L11 incident to the Faraday rotator 4 and the output light L12 and with respect to the interaction magnetic field of the permanent magnet 12 and the electromagnet 13 along the optical axes in order to reduce the loss in polarization control of the input light L1.

Therefore, the biasing permanent magnets 5 can be disposed on the opposite sides of the Faraday rotator 4 as viewed in the direction of the optical axis. Also to the biasing permanent magnets 5, a material similar to that of the permanent magnet 2 described hereinabove can be applied. It is to be noted that the yoke 6 is formed from a soft iron plate or a ferrite material used to prevent deterioration of the magnetic field by the biasing permanent magnets 5, and the yoke 6 supports saturation of the magnetic field component in a direction perpendicular to the optical axes of the lights L1 and L2.

Accordingly, the biasing permanent magnets 5 and the yoke 6 described above form a bias magnetic field application section which applies a bias magnetic field for magnetizing the Faraday rotator 4 into a saturated state in a direction perpendicular to the interaction magnetic field by the permanent magnet 12 and the electromagnet 13.

The control section 17 controls the direction and the magnitude of the current to be supplied to the winding 13b described hereinabove. Consequently, the magnetic component to be generated by the electromagnet 13 can be variably controlled in response to the amount of the Faraday rotation effect (amount of polarization rotation of the lights L11 and L12) to be generated in the lights L11 and L12.

In the polarization control apparatus 10 according to the second embodiment having the configuration described above, the magnitude and the direction of the magnetic field in the directions of the optical axes of the input light L11 incident to the Faraday rotator 4 and the output light L12 reflected and outputted can be varied by a Faraday rotation effect by controlling the current to be supplied to the winding 13b which constitutes the electromagnet 13, and the polarization rotation amounts regarding the lights L11 and L12 can be controlled thereby.

In particular, through the control of the direction and the magnitude of the current to flow through the winding 13b by the control section 17, where the direction of the magnetic pole of the electromagnet 13 and the direction of the magnetic pole generated by the permanent magnet 12 have a relationship that they are the same direction (or where no current is supplied to the electromagnet 13), the magnetic resistance between the electromagnet 13 and the permanent magnet 12 is low, and most part of magnetic fluxes generated by the permanent magnet 12 flows through the core member 13a of the electromagnet 13 which has a high permeability. In this instance, an interaction magnetic field in the direction of an arrow mark A11 (when the electromagnet 13 is off) acts upon the Faraday rotator 4 as seen in FIG. 10.

In particular, where such an interaction magnetic field in the direction of the arrow mark A11 as just described is formed, since magnetic field components along the optical axes of the lights L11 and L12 which act on the Faraday rotator 4 are comparatively little, the amount of rotation of the polarization state by the Faraday rotation effect which the lights L11 and L12 which propagate through the Faraday rotator 4 undergo is comparatively small.

On the other hand, where the direction of the magnetic pole formed by the electromagnet 13 and the direction of the magnetic pole generated by the permanent magnet 12 have a relationship that they are opposite to each other through the control of the direction and the magnitude of the current to flow through the winding 13b by the control section 17, the magnetic resistance between the electromagnet 13 and the permanent magnet 12 is comparatively high. Consequently, the ratio of the magnetic fluxes of the permanent magnet 12 which pass through the core member 13a of the electromagnet 13 is low, and magnetic fluxes which flow from the end portion 12n which forms the N pole of the permanent magnet 12 to the Faraday rotator 4 in a direction perpendicular to the permanent magnet end face 12n are much. In this instance, the Faraday rotator 4 is acted upon by an interaction magnetic field in the direction of the arrow mark A12 (when the electromagnet 13 is on) which is different from the aforementioned direction (refer to the arrow mark A11) In particular, where such an interaction magnetic field in the direction of the arrow mark A12 as described above is formed, a comparatively great amount of magnetic field components along the optical axis of the lights L11 and L12 act upon the Faraday rotator 4. Therefore, the amount of rotation of the polarization state by the Faraday rotation effect which the lights L11 and L12 which propagate in the Faraday rotator 4 undergo is comparatively great.

In this manner, also with the polarization controlling apparatus 10 according to the second embodiment of the present invention, the magnitude and the direction of the interaction magnetic field in the Faraday rotator 4 can be varied by magnetic field components generated by the electromagnet 13 to vary the amount of the Faraday rotation effect to be exerted on the inputted light. Therefore, high-speed operation can be achieved and increase of the power dissipation and increase of the apparatus scale can be suppressed, and the degree of freedom in design can be enhanced when compared with that in the case of the prior art. In other words, since such items as the magnetic force and the type of the permanent magnet 12, a spatial arrangement of components and so forth can be used as design parameters, a higher degree of freedom can be obtained in design of the polarization controlling apparatus 10.

For example, since the varying magnetic field by which a Faraday rotation effect is generated is formed from the interaction magnetic field which varies in response not only to the magnetic field generated by the electromagnet 13 but also to an interaction between the magnetic field of the electromagnet 13 and a magnetic field component provided by the permanent magnet 12, the degree of freedom in design of the direction of the magnetic field variation to be set to the direction of the optical axis increases when compared with that in the case of the prior art wherein a magnetic field component generated by the electromagnet 13 is used directly for a Faraday rotation effect. Consequently, the degree of freedom in apparatus design when a magnetic component applying equipment is added to an optical system to form a polarization controlling apparatus can be enhanced.

Further, the degree of freedom that the variation of the magnetic flux vector distribution of the permanent magnet 12 can be utilized in order to vary the magnetic field component in the direction of the optical axes of the lights L11 and L12 inputted as an object of polarization control by varying the magnetic flux vector distribution of the permanent magnet 12 by the magnetic field of the electromagnet 13 can be added newly. Consequently, it can be anticipated to obtain a greater magnetic field variation than that in the case wherein the amount of polarization rotation of light is controlled merely by the magnetic field variation of the electromagnet 13 as in the prior art. Therefore, increase of the dynamic range of the amount of polarization rotation can be anticipated.

Furthermore, since, in order to rotate the polarization state of the lights L11 and L12 inputted as an object of polarization control by a Faraday rotation effect, an interaction magnetic field formed by an interaction between the magnetic field generated by the electromagnet 13 and the magnetic field generated by the permanent magnet 12 is used as the magnetic field to be given along the optical axes of the lights L11 and L12, the necessity to excessively increase the current to be supplied to the winding 13b of the electromagnet 13 or increase the number of turns of the winding 13b to such a degree that some problem occurs with the speed of response in order to assure the dynamic range of the angle of polarization rotation as in the case of the prior art is mitigated. Also from this, such a restriction to the degree of freedom in design of an apparatus as appears in the prior art can be eliminated.

It is to be noted that, while, in the arrangement described hereinabove with reference to FIG. 9, a pair of permanent magnets are used as the biasing permanent magnets 5, according to the present invention, the biasing permanent magnet is not limited to them, but, for example, a C-shaped permanent magnet 5C formed such that it sandwiches the Faraday rotator 4 with the opposite poles of the S pole and the N pole thereof as seen in FIG. 12 may be applied.

Further, while the first core portion 13a-1 which composes the electromagnet 13 described hereinabove is made of a material similar to that of the other second core portion 13a-2, according to the present invention, the first core portion 13a-1 may be made of a material different from that of the second core portion 13a-2 only if the material is a substance whose relative permeability in an unsaturated state is 10 or more.

B2. First Modification to the Second Embodiment

Figure 13:
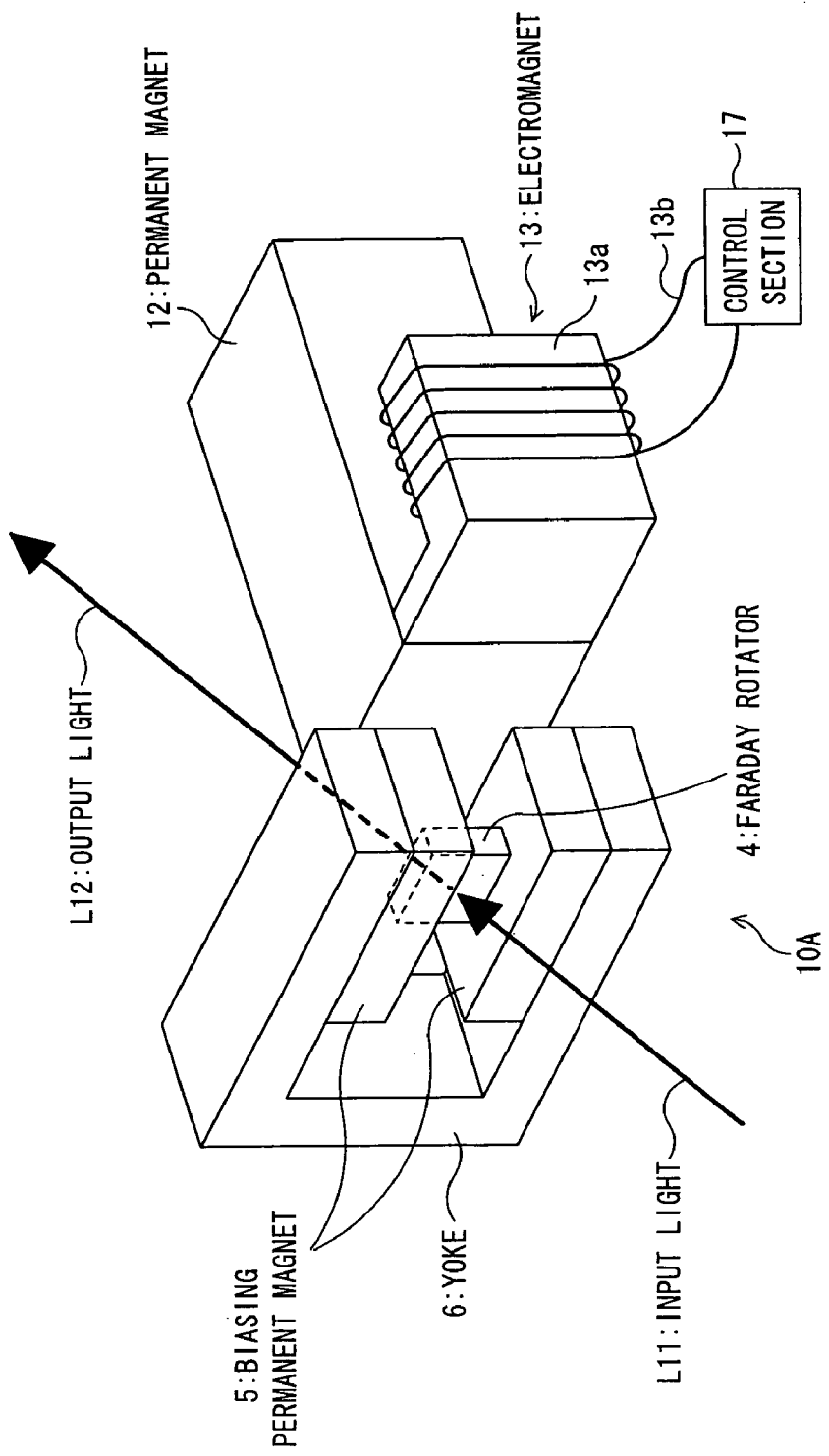
Figure 14:
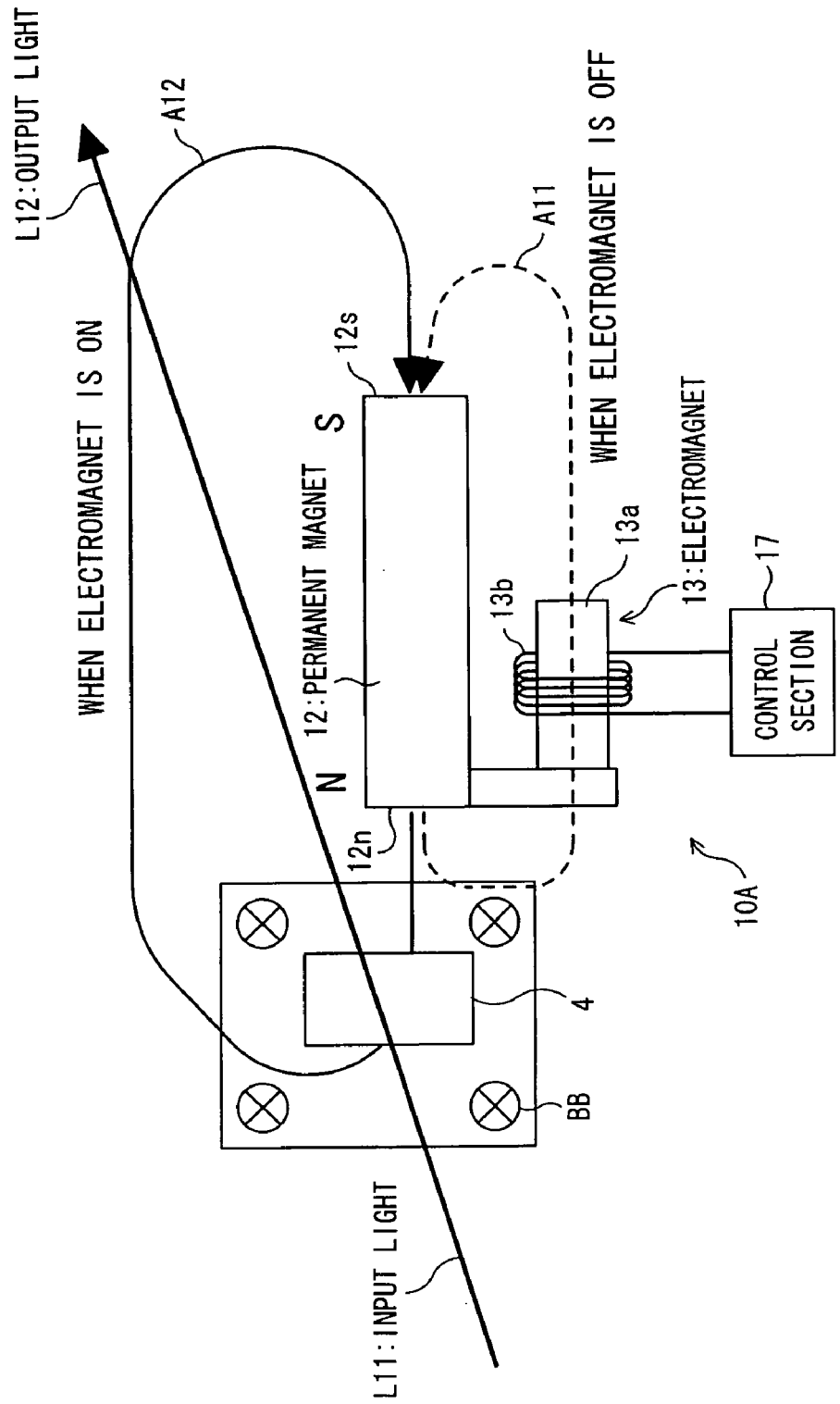

FIG. 13 is a schematic view showing a polarization controlling apparatus 10A according to a first modification to the second embodiment of the present invention, and FIG. 14 is a view illustrating a relationship between a variation of a magnetic field in response to a variation of current to be supplied to the winding 13b and the optical axes of input and output lights in the polarization controlling apparatus 10A shown in FIG. 13 and is a view of the polarization controlling apparatus 10A as viewed in a direction from above in FIG. 13.

Referring to FIG. 13, the polarization controlling apparatus 10A shown has, when compared with that described hereinabove with reference to FIG. 9 (refer to reference numeral 10), a mode of introduction of input light of an object of polarization control and an output mode of output light whose polarization is controlled, which correspond to those shown in FIG. 1(a). In particular, the polarization controlling apparatus 10A is different from the polarization control apparatus 10 in that it does not include the reflecting member 8, and consequently, input light L11 incident to the Faraday rotator 4 passes through the Faraday rotator 4 and is outputted as output light L12 whose polarization is controlled. However, the polarization controlling apparatus 10A is basically similar in a configuration of the other part thereof to that of the second embodiment described hereinabove. It is to be noted that, in FIGS. 13 and 14, like reference characters denote substantially like elements to those of FIGS. 9 and 10).

It is to be noted that the optical axes of the input light L11 and the output light L12 are included in a plane parallel to the bias magnetic field component BB, and the effective magnetic field component BV acts so as to exert a Faraday rotation effect on the input light L11.

Also in the polarization control apparatus 10 having the configuration described above, polarization rotation control can be performed by an interaction magnetic field of the permanent magnet 12 and the electromagnet 13 similarly as in the polarization control apparatus 10 according to the second embodiment. Consequently, similar advantages to those of the second embodiment can be achieved.

Figure 15:
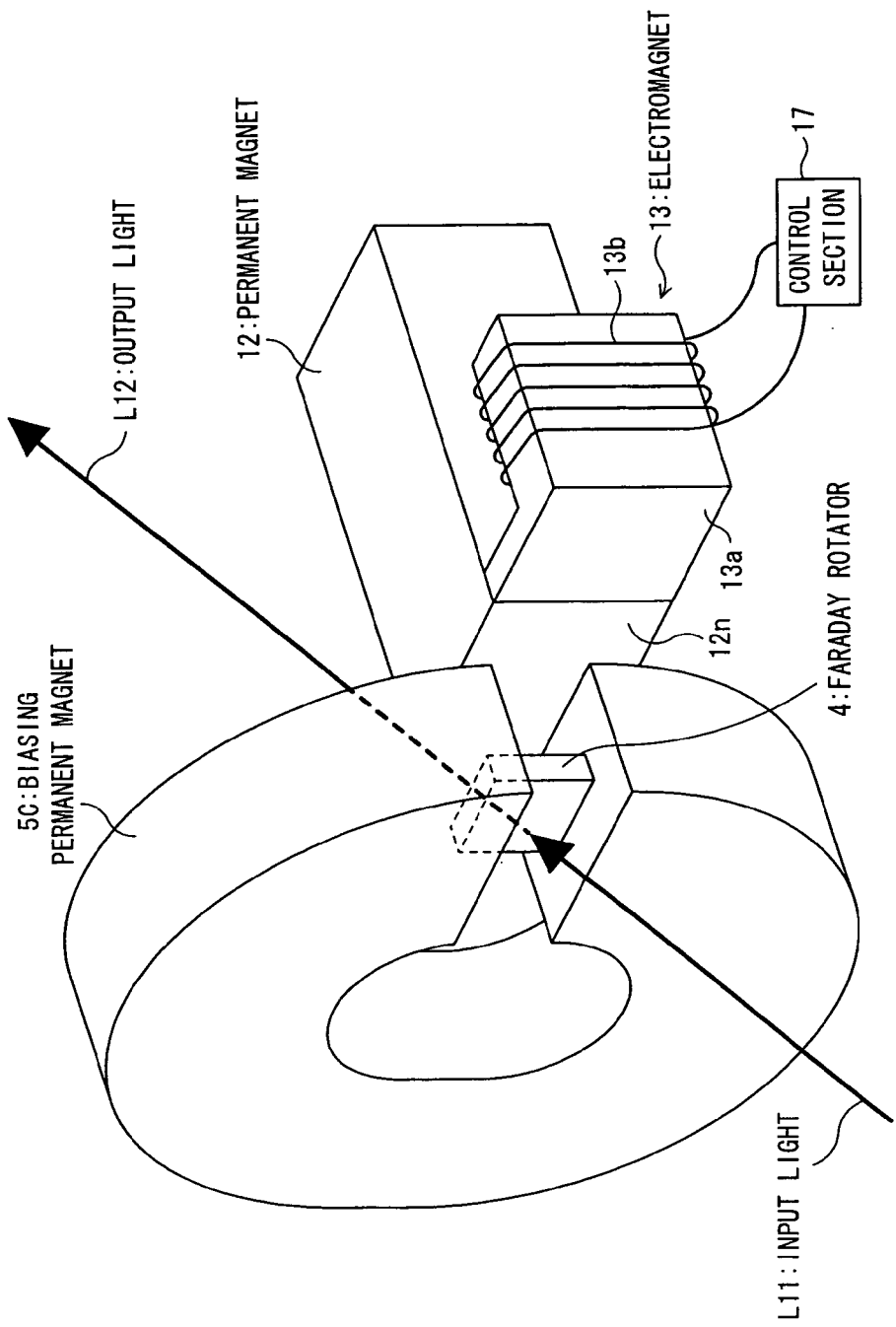

It is to be noted that, also in such a polarization controlling apparatus 10A as described above, for example, a C-shaped permanent magnet SC formed such that it sandwiches the Faraday rotator 4 with the opposite poles of the S pole and the N pole thereof as seen in FIG. 15 may be applied in place of the biasing permanent magnets 5.

B3. Second Modification to the Second Embodiment

Figure 16:
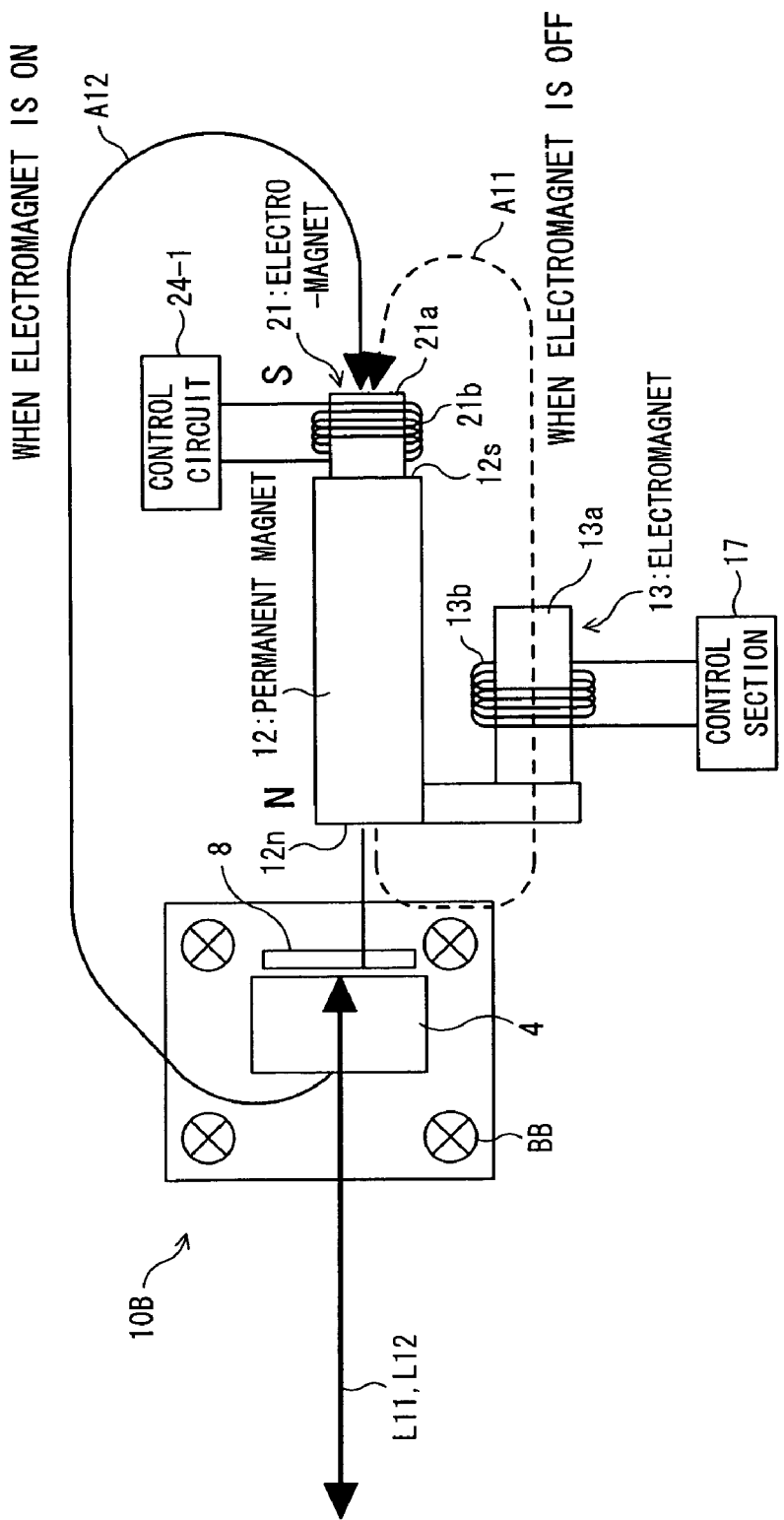

FIG. 16 is a schematic view showing a polarization controlling apparatus 10B according to a second modification to the second embodiment of the present invention. Referring to FIG. 16, the polarization controlling apparatus 10B shown is different from the polarization control apparatus 10 (refer to reference numeral 10) in that it additionally includes an electromagnet 21 and a control circuit 24-1 provided on the magnetic pole face 12s side of the permanent magnet 12 at which the magnetic pole (S pole) is provided remote from the magnetic pole (N pole) with which the first core portion 13a-1 of the electromagnet 13 contacts. It is to be noted that, in FIG. 16, like reference characters denote substantially like elements to those of FIG. 9.

Also the electromagnet 21 includes a core member 21a and a winding (coil) 21b wound on the core member 21a, and can generate a magnetic field having a polarity same as that of the permanent magnet 12 with current to be supplied to the winding 21b through the control circuit 24-1. In particular, the electromagnet 21 can amplify the magnitude of the magnetic field to be introduced into the magnetic pole face 12s of the permanent magnet 12. Consequently, for example, even if the magnetism of the permanent magnet 12 decreases, an interaction magnetic field of a sufficient magnitude for polarization control can be provided to the Faraday rotator 4 by the amplification action of the magnetic field by the electromagnet 21. Consequently, the reliability of the polarization controlling apparatus 10B can be raised.

Figure 17:
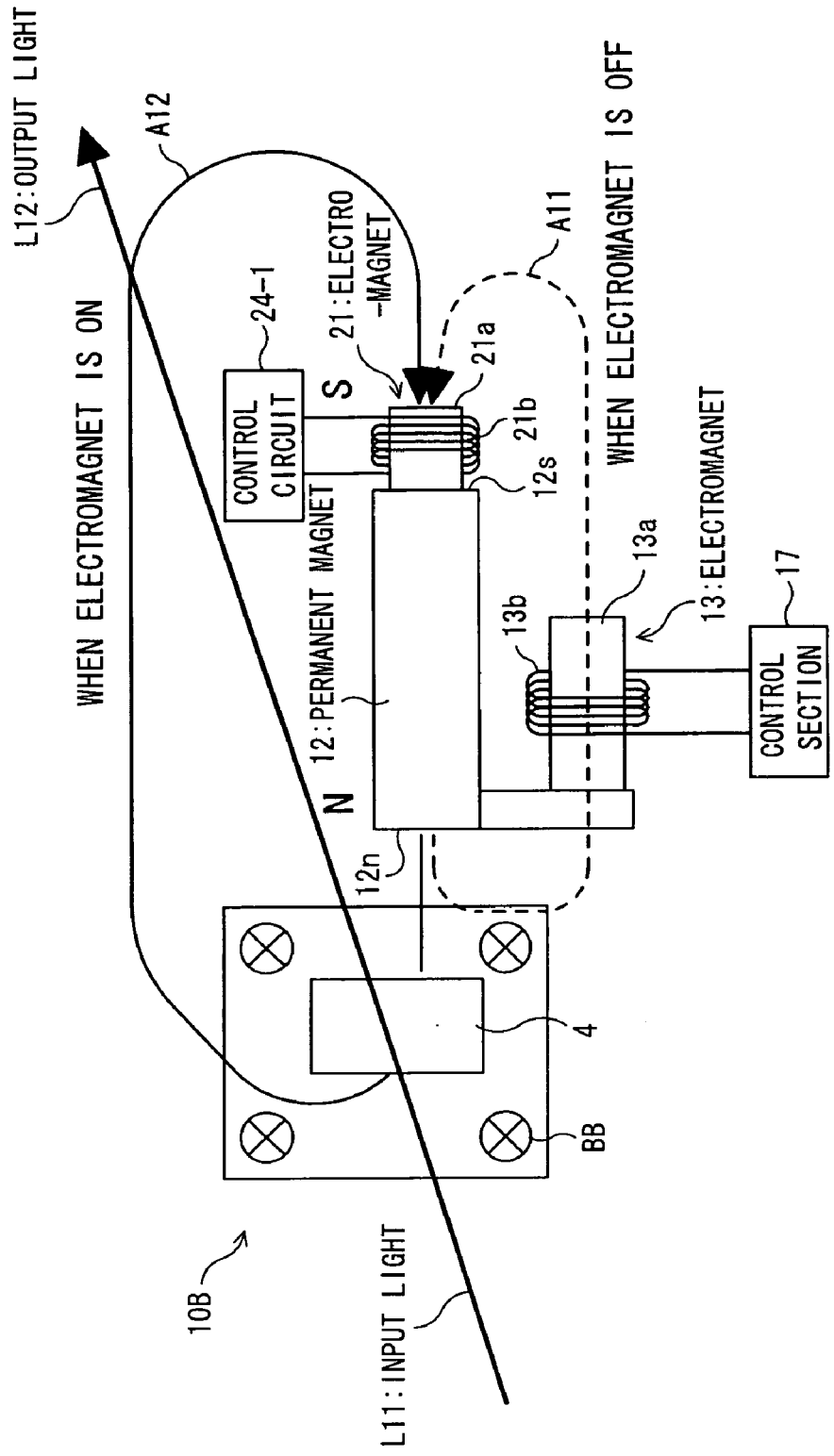

Further, the configuration of the polarization controlling apparatus 10A shown in FIGS. 13 and 14 may be additionally provided with the electromagnet 21 and the control circuit 24-1 on the magnetic pole face 12s side similarly as in the case of FIG. 16 as seen in FIG. 17. Also with the modification shown in FIG. 17, the reliability can be raised similarly to the polarization controlling apparatus 10B shown in FIG. 16.

B4. Third Modification to the Second Embodiment

Figure 18:
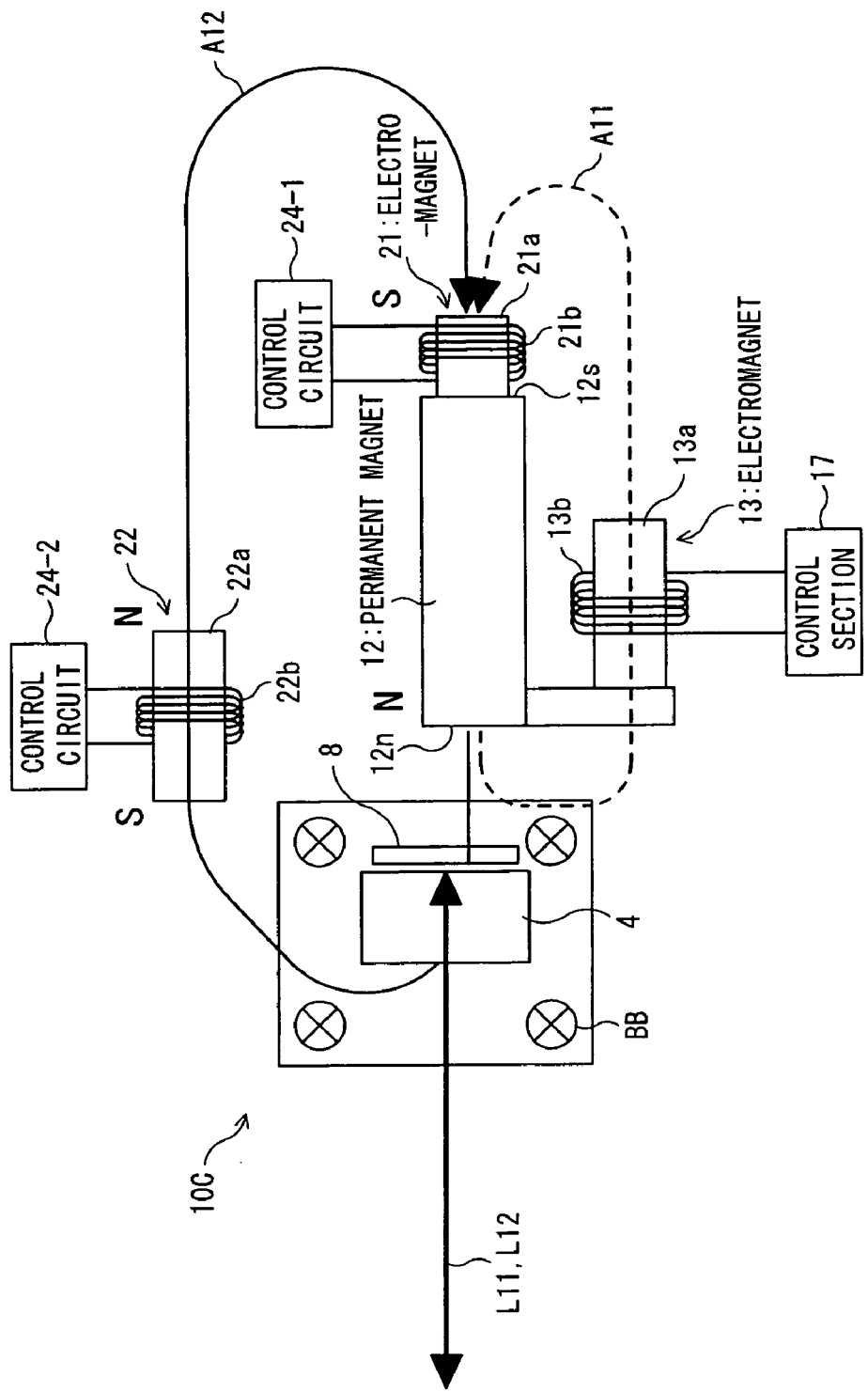

FIG. 18 is a schematic view showing a polarization controlling apparatus 10C according to a third modification to the second embodiment of the present invention. Referring to FIG. 18, the polarization controlling apparatus 10C shown additionally includes, where a magnetic field in a direction opposite to the direction of the magnetic field formed by the permanent magnet 12 is formed by the electromagnet 13, another electromagnet 22 including a core member 22a and a winding 22b. The electromagnet 22 is provided on magnetic lines of force by the interaction magnetic field (refer to an arrow mark A12) formed by an interaction of the permanent magnet 12 and the electromagnet 13 in order to increase the ratio of the magnetic flux distribution of the interaction magnetic field A12.

Further, a control circuit 24-2 can be added together with the electromagnet 22 described above to the configuration of the polarization controlling apparatus 10B shown in FIG. 16 as in the case of the polarization controlling apparatus 10C shown in FIG. 18. The control circuit 24-2 supplies the winding 22b with such current as to form a magnetic field in the same direction as that of the arrow mark A12 where the electromagnet 13 forms a magnetic field in a direction opposite to the direction of the magnetic field formed by the permanent magnet 12.

In particular, where the electromagnet 13 is driven so as to form a magnetic field in the opposite direction to that of the permanent magnet 12 so that the polarization states of the lights L11 and L12 of an object of polarization control are rotated by the Faraday rotator 4, the control circuit 24-2 supplies current to the winding 22b in response to supply of current to the winding 13b by the control section 17. On the other hand, where the electromagnet 13 is driven to form a magnetic field in the same direction as that of the permanent magnet 12, the control circuit 24-2 controls so that no current is supplied to the electromagnet 22 or a magnetic field in the direction opposite to the direction of the arrow mark A12 is generated.

By such an amplification action of the magnetic force by the electromagnet 22, a sufficient magnetic force required for a Faraday rotation effect can be provided to the Faraday rotator 4.

B5. Fourth Modification to the Second Embodiment

Figure 19:
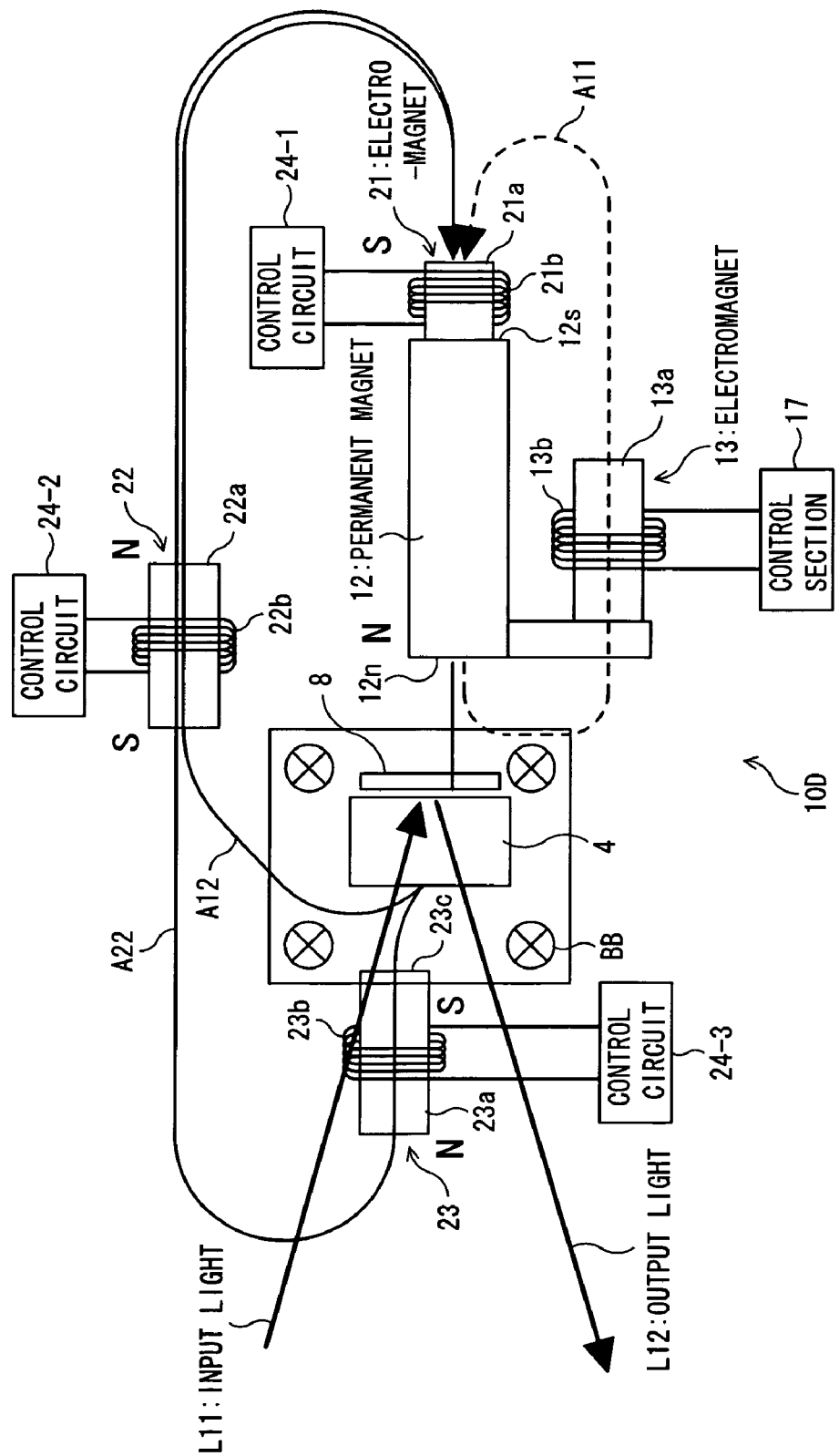

FIG. 19 is a schematic view showing a polarization controlling apparatus 10D according to a fourth modification to the second embodiment of the present invention. Referring to FIG. 19, the polarization controlling apparatus 10D shown additionally includes, where a magnetic field in a direction opposite to the direction of the magnetic field formed by the permanent magnet 12 is formed by the electromagnet 13, another electromagnet 23. The electromagnet 23 is provided in such a manner as to cooperate with the permanent magnet 12 to sandwich the Faraday rotator 4 therebetween in order that the magnetic force of the interaction magnetic field formed by an interaction of the permanent magnet 12 and the electromagnet 13 may act upon the Faraday rotator 4 much more.

The electromagnet 23 is disposed such that a face thereof which forms a magnetic pole face 23c is opposed to the permanent magnet end face 12n of one of the magnetic poles of the permanent magnet 12 (in this instance, the N pole). Further, the Faraday rotator 4 is disposed at a position at which a magnetic field in a direction substantially perpendicular to the mutually opposed magnetic pole faces 12n and 23c of the permanent magnet 12 and the electromagnet 23 acts as an interaction magnetic field of the permanent magnet 12 and the electromagnet 23.

The electromagnet 23 includes a core member 23a and a winding (coil) 23b wound on the core member 23a and can increase those magnetic fluxes which pass through the Faraday rotator 4 as indicated by an arrow mark A22 from among magnetic fluxes generated by current supplied to the winding 23b through a control circuit 24-3 and formed by the permanent magnet 12 so as to flow from the magnetic pole face 12n to the magnetic pole face 12s.

In particular, where the polarization states of the lights L11 and L12 of an object of polarization control are to be rotated by the Faraday rotator 4, the control circuits 24-2 and 24-3 supply current to the windings 22b and 23b in response to supply of current of the control section 17 to the winding 13b. On the other hand, where the electromagnet 13 is driven so as to form a magnetic field in the same direction as that of the permanent magnet 12, the control circuit 24-2 controls so that no current is supplied to the winding 22b or a magnetic field in the direction opposite to the direction of the arrow mark A12 is generated by the winding 22b while the control circuit 24-3 controls so that a magnetic field in the direction opposite to that of the arrow mark A12 is generated by the winding 23b.

By such an amplification action of the magnetic force by the electromagnets 22 and 23 as described above, magnetic fluxes indicated by the arrow marks A12 and A22 can be provided to the Faraday rotator 4. Consequently, a sufficient magnetic force required for a Faraday rotation effect can be provided to the Faraday rotator 4.

B6. Fifth Modification to the Second Embodiment

Figure 20:
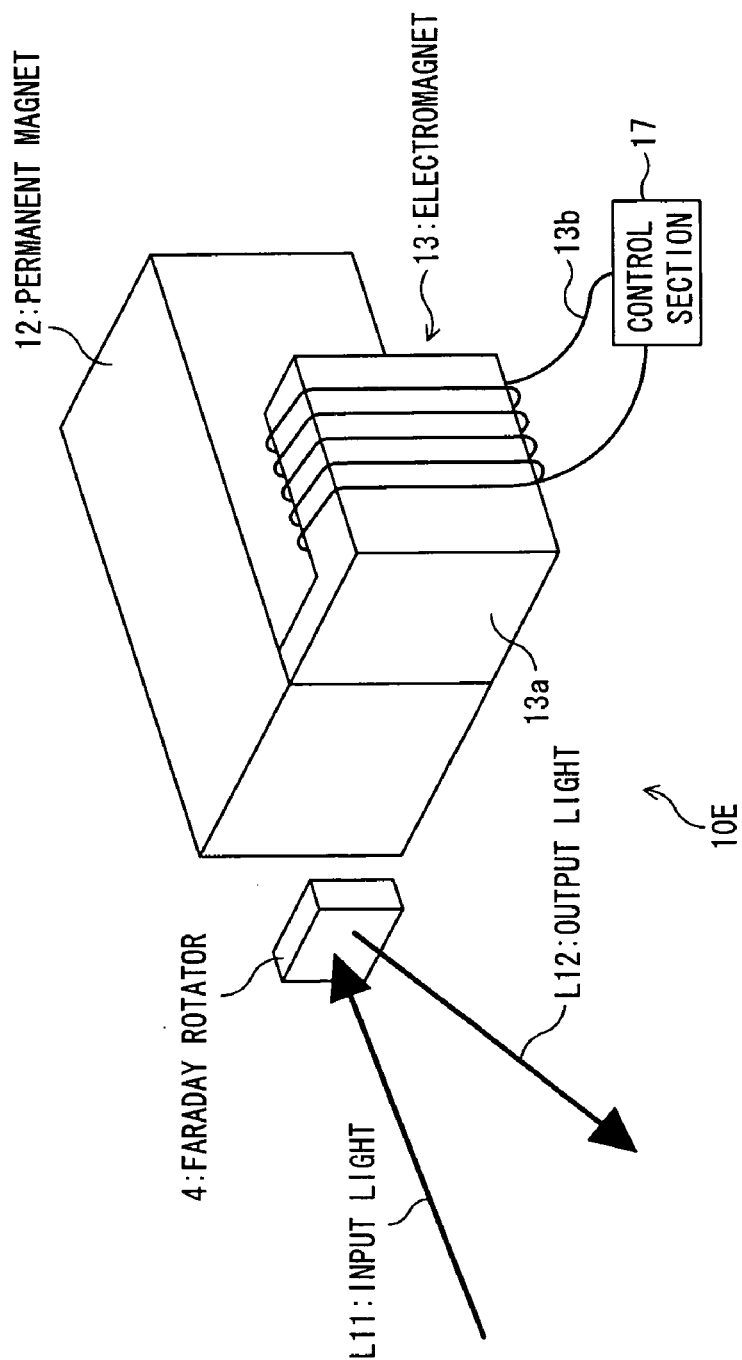
Figure 21:
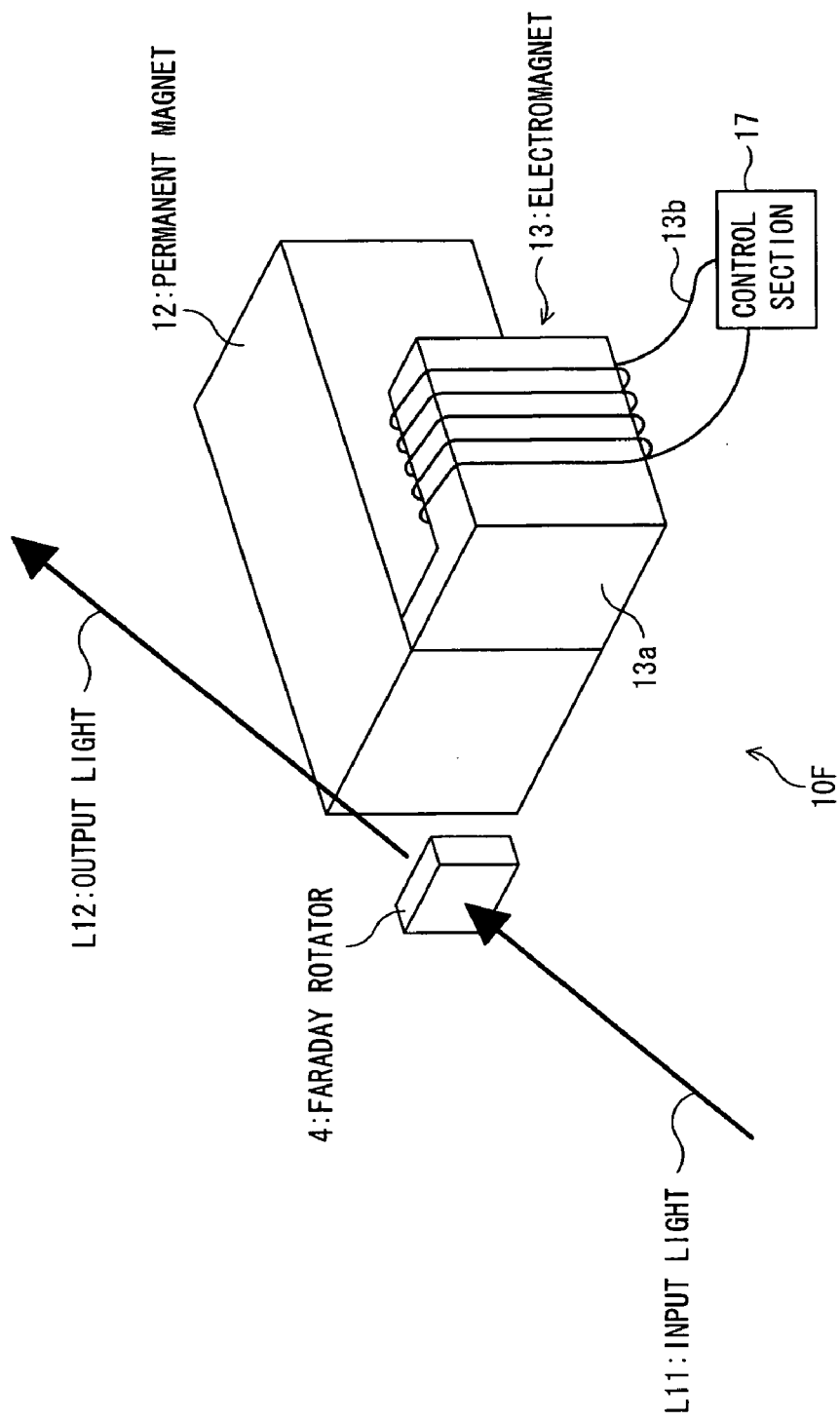

The polarization control apparatus 10 described hereinabove with reference to FIG. 9 or the polarization controlling apparatus 10A described hereinabove with reference to FIG. 13 may be configured otherwise such that the biasing permanent magnets 5 and the yoke 6 are omitted as in the case of a polarization control apparatus 10E or 10F shown in FIG. 20 or 21. Also with the polarization control apparatus 10E or 10F, the polarization state of light of an object of polarization control can be rotated by a Faraday rotation effect by the direction of a magnetic field formed by an interaction at least between the direction of the magnetic field formed by the electromagnet 13 and the direction of the magnetic field formed by the permanent magnet 12, and the light of the rotated polarization state can be outputted as the output light. Consequently, advantages similar to those achieved by the second embodiment described above can be achieved.

B7.

The configurations of the modifications to the second embodiment described above may be carried out in suitable combination.

C1. Third Embodiment

Figure 22:
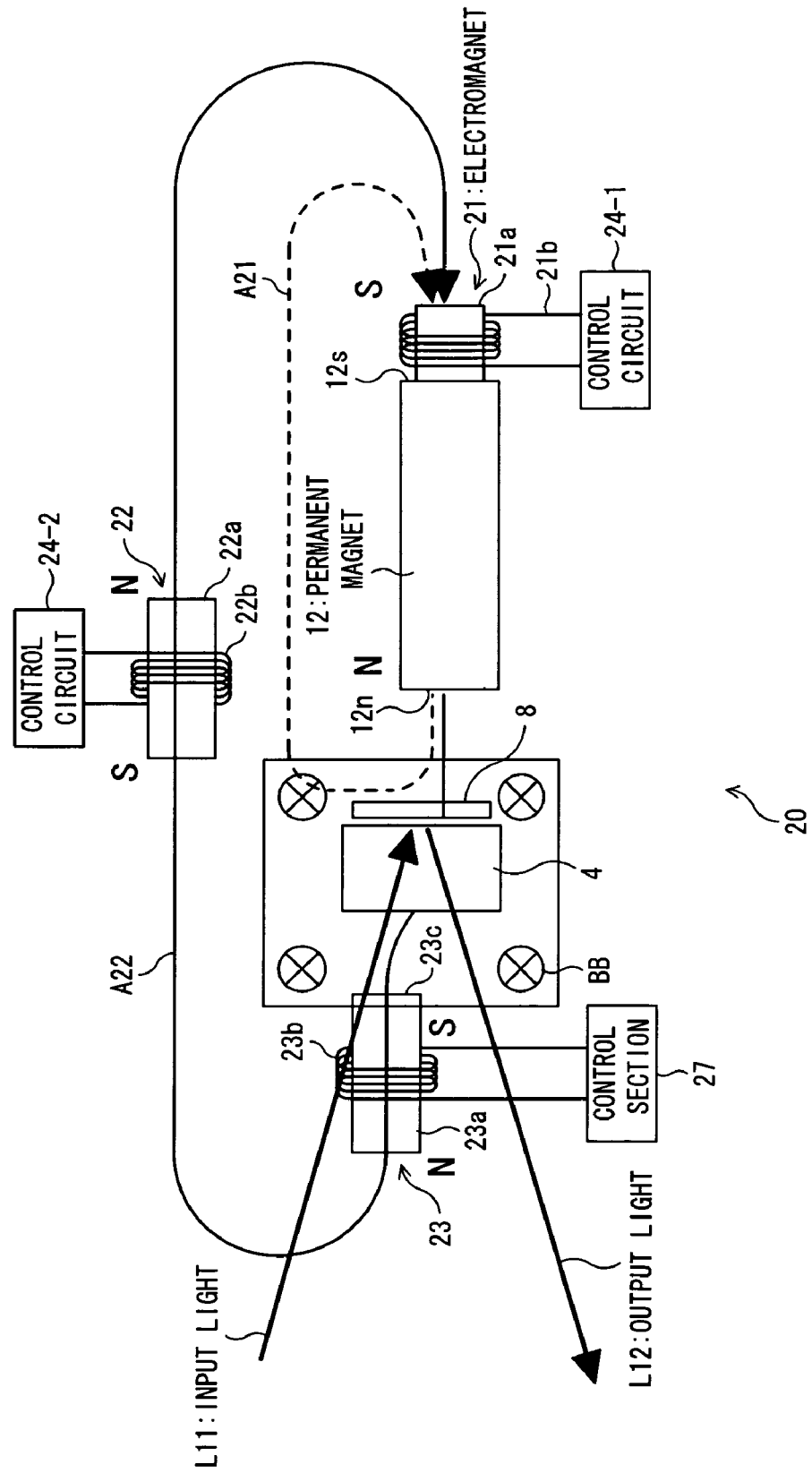
FIG. 22 is a schematic view showing a polarization controlling apparatus according to a third embodiment of the present invention.

FIG. 22 shows a polarization control apparatus 20 according to a third embodiment of the present invention. Referring to FIG. 22, the polarization control apparatus 20 shown is different from the polarization control apparatus 10 (refer to FIG. 9) according to the second embodiment described hereinabove in that it does not include the L-shaped electromagnet 13 which contacts with the N pole of the permanent magnet 12 but includes an electromagnet 23 which uses a magnetic field by the permanent magnet 12 so as to lead a magnetic field for exerting a Faraday rotation effect of light to the Faraday rotator 4.

The polarization control apparatus 20 according to the third embodiment includes, in addition to the electromagnet 23 described above and a control section 27 for driving the electromagnet 23, a permanent magnet 12, a Faraday rotator 4 and a reflecting member 8 as well as biasing permanent magnets 5 and a yoke 6 not shown which are similar to those described hereinabove with reference to FIG. 9. The polarization control apparatus 20 further includes electromagnets 21 and 22 similar to those of the polarization control apparatus 10 shown in FIG. 18 and control circuits 24-1 and 24-2 for driving the electromagnets 21 and 22, respectively. It is to be noted that, in FIG. 22, like reference characters denote substantially like elements to those of FIG. 18.

It is to be noted that the biasing permanent magnets 5 and the yoke 6 may be replaced by such a permanent magnet 5C as shown in FIG. 12. The electromagnets 21 and 22 and the control circuits 24-1 and 24-2 maybe omitted suitably.

The electromagnet 23 is disposed such that a face thereof which forms a magnetic pole face 23c is opposed to the magnetic pole face 12n of one of the magnetic poles of the permanent magnet 12 (in this instance, the N pole). Further, the Faraday rotator 4 is disposed at a position at which a magnetic field in a direction substantially perpendicular to the magnetic pole faces 12n and 23c of the permanent magnet 12 and the electromagnet 23 acts as an interaction magnetic field of the permanent magnet 12 and the electromagnet 23. In the third embodiment, the Faraday rotator 4 is interposed at a position between the magnetic pole face 23c of the electromagnet 23 and the magnetic pole face 12n of the permanent magnet 12 which are disposed in an opposing relationship to each other as described above.

The electromagnet 23 includes a core member 23a and a winding (coil) 23b wound on the core member 23a and can increase those magnetic fluxes which pass through the Faraday rotator 4 from among magnetic fluxes generated by current supplied to the winding 23b through the control circuit 27 and formed by the permanent magnet 12 so as to flow from the magnetic pole face 12n to the magnetic pole face 12s.

In particular, the electromagnet 23 can rotate the polarization states of lights L11 and L12 of an object of polarization control by a Faraday rotation effect by increasing magnetic fluxes which pass through the Faraday rotator 4 in this manner. It is to be noted that the optical paths of the input light L11 incident to the Faraday rotator 4 and the output light L12 reflected and outputted are set suitably so as not to interfere with the location of the electromagnet 23.

In other words, the control section 27 can variably control the magnetic field components to be generated by the electromagnet 23 in response to the amount of the Faraday rotation effect exerted on inputted light. In particular, the control section 27 can increase the amount of the Faraday rotation effect to be exerted on inputted light by increasing the magnitude of the interaction magnetic field of the permanent magnet 12 and the electromagnet 23 while the direction of the magnetic field component to be generated by the electromagnet 23 is set so as to be same as the direction of the magnetic field generated by the permanent magnet 12 (or no magnetic field is generated spontaneously by the magnetic field).

Also in the polarization control apparatus 20 according to the third embodiment having such a configuration as described above, the magnitude of the magnetic field in the directions of the optical axes of the input light L11 incident to the Faraday rotator 4 and the output light L12 reflected and outputted can be varied by a Faraday rotation effect by controlling the current to be supplied to the winding 23b which composes the electromagnet 23. Consequently, the polarization rotation amounts regarding the lights L11 and L12 can be controlled thereby.

In particular, through the control of the direction and the magnitude of the current to flow through the winding 23b by the control section 27, where the direction of the magnetic pole of the electromagnet 23 and the direction of the magnetic pole generated by the permanent magnet 12 are a relationship that they are opposite to each other, the magnetic resistance between the electromagnet 23 and the permanent magnet 12 is high, and most part of magnetic fluxes emerging from the magnetic pole face 12n of the permanent magnet 12 flows not through the Faraday rotator 4 but through the electromagnets 22 and 21, which are driven in the same magnetic field direction as that of the permanent magnet 12, and enters the S pole of the permanent magnet 12. In this instance, an interaction magnetic field in the direction of an arrow mark A21 acts upon the Faraday rotator 4 as seen in FIG. 22.

In particular, where such an interaction magnetic field in the direction of the arrow mark A21 as described above is formed, magnetic components along the optical axes of the lights L11 and L12 which act upon the Faraday rotator 4 are comparatively little, and the amount of rotation of the polarization states by a Faraday rotation effect exerted on the lights L11 and L12 which propagate through the Faraday rotator 4 is comparatively little.

On the other hand, where the direction of the magnetic pole formed by the electromagnet 23 and the direction of the magnetic pole generated by the permanent magnet 12 have a relationship that they are the same direction through the control of the direction and the magnitude of the current to flow through the winding 23b by the control section 27, the magnetic resistance between the electromagnet 23 and the permanent magnet 12 is low. Consequently, the ratio of the magnetic fluxes of the permanent magnet 12 which pass through the core member 23a of the electromagnet 23 increaced, and magnetic fluxes which flow from the end portion 12n which forms the N pole of the permanent magnet 12 to the Faraday rotator 4 in a direction perpendicular to the end portion 12n increase. In this instance, the Faraday rotator 4 is acted upon by an interaction magnetic field in the direction of an arrow mark A22 which is different from the aforementioned direction (refer to the arrow mark A21).

In particular, where such an interaction magnetic field in the direction of the arrow mark A22 as described above is formed, a comparatively great amount of magnetic field components along the optical axis of the lights L11 and L12 act upon the Faraday rotator 4. Therefore, the amount of rotation of the polarization state by the Faraday rotation effect which the lights L11 and L12 which propagate in the Faraday rotator 4 undergo is comparatively great.

In this manner, also in the polarization control apparatus 20 according to the third embodiment of the present invention, the direction and the magnitude of the magnetic field including magnetic fluxes of the permanent magnet 12 which exert a high magnetic power to the Faraday rotator 4 can be varied by varying the direction and the magnitude of the electromagnet 23. Therefore, high-speed operation can be achieved and increase of the power dissipation and increase of the apparatus scale can be suppressed, and the degree of freedom in design can be enhanced when compared with that in the case of the prior art. In other words, since such items as the magnetic force and the type of the permanent magnet 12, a spatial arrangement of components and so forth can be used as design parameters, a higher degree of freedom can be obtained in design of the polarization controlling apparatus 20.

For example, since the varying magnetic field by which a Faraday rotation effect is generated is formed from the interaction magnetic field which varies in response to an interaction between the magnetic field generated by the electromagnet 23 and a magnetic field component provided by the permanent magnet 12, the degree of freedom in design of the direction of the magnetic field variation to be set to the direction of the optical axis increases when compared with that in the case of the prior art wherein a magnetic field component generated only by an electromagnet is used directly for a Faraday rotation effect. Consequently, the degree of freedom in apparatus design when a magnetic component applying equipment is added to an optical system to form a polarization controlling apparatus can be enhanced.

Further, the degree of freedom that the variation of the magnetic flux vector distribution of the permanent magnet 12 can be utilized in order to vary the magnetic field component in the direction of the optical axes of the lights L11 and L12 inputted as an object of polarization control by varying the magnetic flux vector distribution of the permanent magnet 12 by the magnetic field of the electromagnet 23 can be added newly. Consequently, it can be anticipated to obtain a greater magnetic field variation than that in the case wherein the amount of polarization rotation of light is controlled merely by the magnetic field variation of the electromagnet 23 as in the prior art. Therefore, increase of the dynamic range of the amount of polarization rotation can be anticipated.

Furthermore, since, in order to rotate the polarization state of the lights L11 and L12 inputted as an object of polarization control by a Faraday rotation effect, an interaction magnetic field formed by an interaction between the magnetic field generated by the electromagnet 23 and the magnetic field generated by the permanent magnet 12 is used as the magnetic field to be given along the optical axes of the lights L11 and L12, the necessity to excessively increase the current to be supplied to the winding 23b of the electromagnet 23 or increase the number of turns of the winding 23b to such a degree that some problem occurs with the speed of response in order to assure the dynamic range of the angle of polarization rotation as in the case of the prior art is eliminated. Also from this, such a restriction to the degree of freedom in design of an apparatus as appears in the prior art can be eliminated.

It is to be noted that, while, in the third embodiment described above, the region sandwiched by the opposed magnetic pole faces 12n and 23c of the permanent magnet 12 and the electromagnet 23 is formed as a space, some other known substance whose relative permeability in an unsaturated state is 10 or less may be interposed between the opposing opposed magnetic pole faces 12n and 23c of the permanent magnet 12 and the electromagnet 23.

C2. Modification to the Third Embodiment

Figure 23:
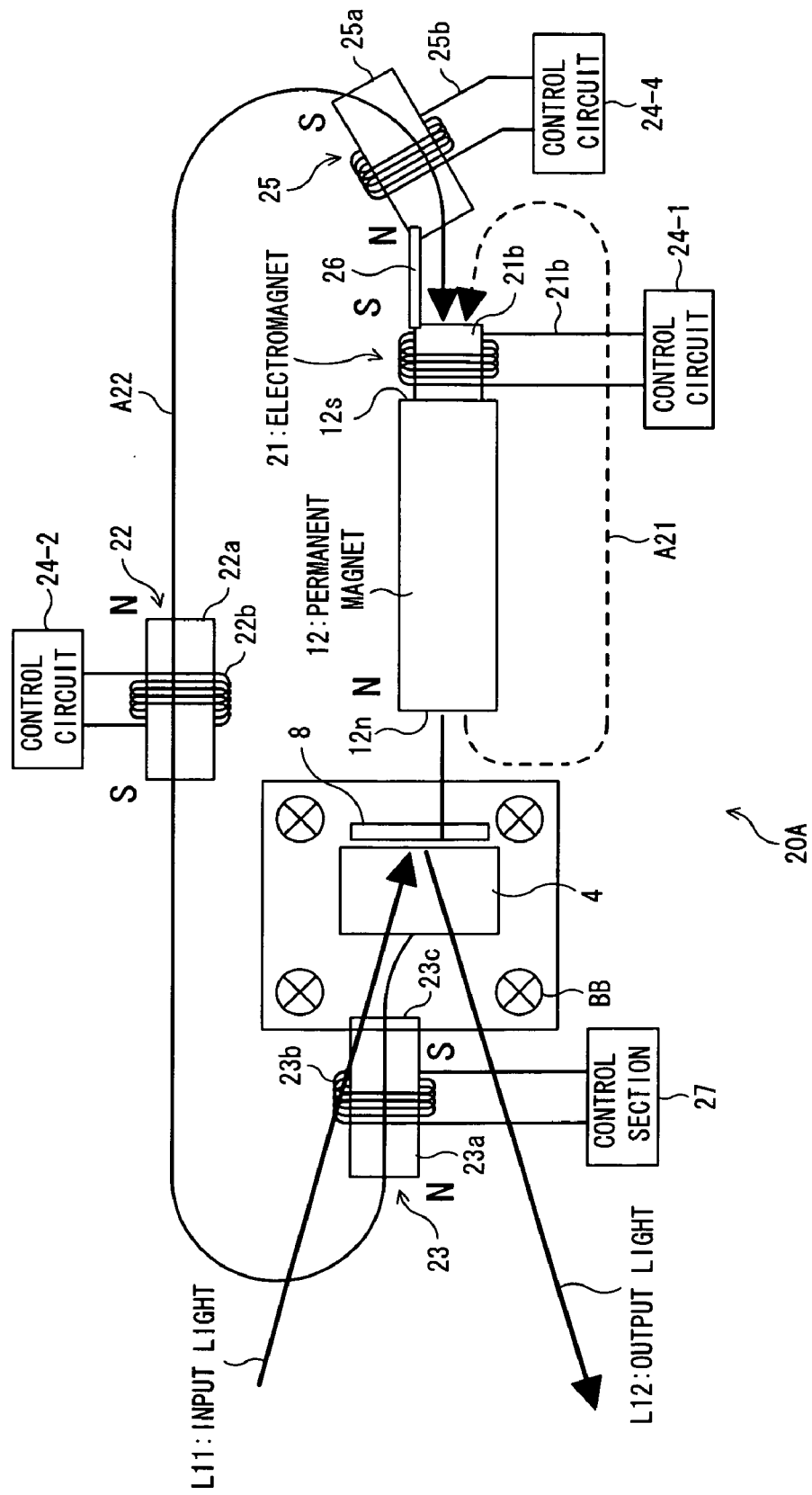
FIG. 23 is a schematic view showing a modification to the third embodiment of the present invention.

FIG. 23 shows a polarization control apparatus 20A according to a modification to the third embodiment of the present invention. Referring to FIG. 23, the polarization control apparatus 20A shown is configured such that, in order to amplify the magnetic force of the interaction magnetic field (refer to an arrow mark A22) formed by an interaction of the permanent magnet 12 and the electromagnet 23 where a magnetic field in the same direction as that of the magnetic field formed by the permanent magnet 12 is formed by the electromagnet 23, an electromagnet 25 including a core member 25a and a winding 25b is further connected to the electromagnet 21 through a connection member 26 made of a material having such a comparatively high permeability as may correspond to that of the core member. It is to be noted that, in FIG. 23, like reference characters denote substantially like elements to those of FIG. 21.

Further, a control circuit 24-4 supplies such current as to form a magnetic field in the same direction as that of the arrow mark A22 to the winding 25b where the electromagnet 23 forms a magnetic field in a direction same as that of the magnetic field formed by the permanent magnet 12.

In particular, where the electromagnet 23 is driven so as to form a magnetic field in a direction same as that of the permanent magnet 12 to rotate the polarization states of lights L11 and L12 of an object of polarization control by means of the Faraday rotator 4, the control circuit 24-4 supplies current to the winding 25b in response to supply of current to the winding 23b by the control section 27. On the other hand, where the electromagnet 23 forms a magnetic field in a direction opposite to the direction of the permanent magnet 12 or does not receive supply of current, the control circuit 24-4 controls so that current for generating a magnetic field in a direction opposite to that of arrow mark A22 is supplied to the electromagnet 25.

Together with such electromagnets 21 and 22 as described above, the electromagnet 25 can provide, by an amplification action of the magnetic force thereof, a sufficient magnetic force required for a Faraday rotation effect to the Faraday rotator 4.

D1. Fourth Embodiment

Figure 24:
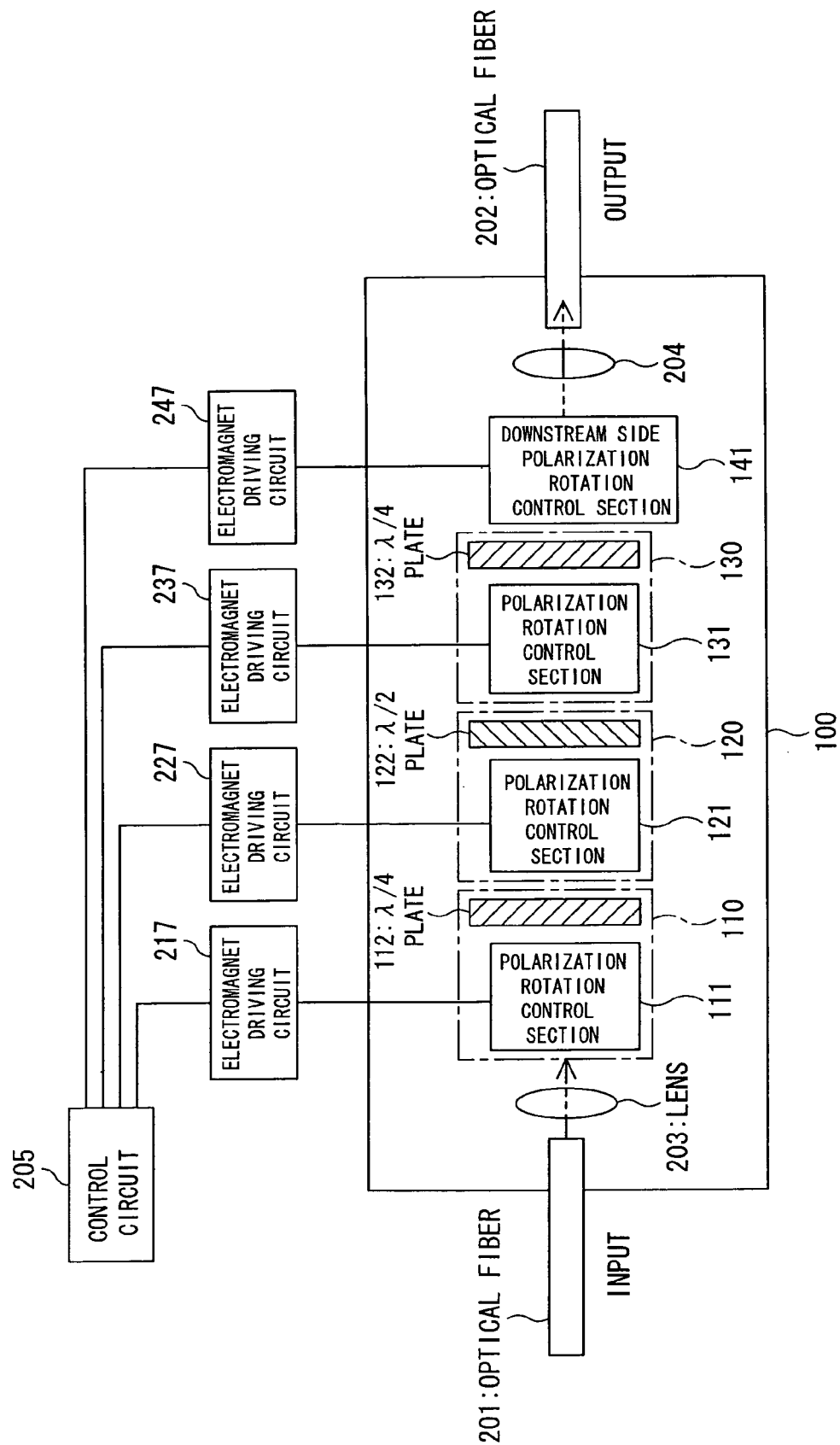
FIG. 24 is a block diagram showing a polarization controlling apparatus having a polarization scrambler function according to the present invention.

FIG. 24 is a block diagram showing a polarization operation apparatus 100 according to a fourth embodiment of the present invention. Referring to FIG. 24, the polarization operation apparatus 100 provides expandability with regard to the axis of rotation around which the polarization state of light inputted through an input side optical fiber 201 can be rotated when compared with the polarization controlling apparatus of the embodiments described hereinabove. To this end, the polarization operation apparatus 100 includes a plurality of (three in the fourth embodiment) polarization rotation control section-wave plate pairs 110, 120 and 130, and a downstream side polarization rotation control section 141 provided on the downstream side of the polarization rotation control section-wave plate pairs 110, 120 and 130.

The three polarization rotation control section-wave plate pairs 110, 120 and 130 are disposed in tandem along the propagation direction of light inputted from the input side optical fiber 201. The polarization rotation control section-wave plate pairs 110, 120 and 130 include polarization rotation control sections 111, 121 and 131 and wave plates 112, 122 and 132 disposed on the downstream side in the propagation direction of light with respect to the polarization rotation control sections 111, 121 and 131, respectively.

It is to be noted that reference numeral 203 denotes a lens for introducing light from the input side optical fiber 201 to the polarization rotation control section 110, and 204 denotes a lens for introducing light outputted from the downstream side polarization rotation control section 141 to an output side optical fiber 202.

Further, together with the three polarization rotation control sections 111, 121 and 131 of the polarization rotation control section-wave plate pairs 110, 120 and 130, the downstream side polarization rotation control section 141 is configured similarly to the polarization controlling apparatus 1 [refer to FIGS. 1(*a*) and 1(*b*)] according to the first embodiment described hereinabove. It is to be noted that reference numerals 217, 227, 237 and 247 denote electromagnet driving circuits for supplying driving current to electromagnets not shown which correspond to the electromagnet 3 in the polarization controlling apparatus 1 and form the polarization rotation control sections 111, 121, 131 and 141, respectively. The electromagnet driving circuits 217, 227, 237 and 247 correspond to the control section 7 shown in FIGS. 1(*a*) and 1(*b*).

Further, a control circuit 205 controls and sets the magnitude of driving current to the polarization rotation control sections 111, 121, 131 and 141 in the electromagnet driving circuits 217, 227, 237 and 247. The polarization rotation control sections 111, 121, 131 and 141 whose driving current is controlled and set by the control circuit 205 can individually rotate the main axis of polarization of light by an intended amount.

At this time, since each of the polarization rotation control sections 111, 121, 131 and 141 varies the magnitude and the direction of the interaction magnetic field for the Faraday rotator 4 based on driving current controlled and set by the control circuit 205, the amount of the Faraday rotation effect exerted on the inputted light can be varied similarly as in the case of the first embodiment described hereinabove. Consequently, high-speed operation can be achieved while increase of the power dissipation and increase of the apparatus scale are suppressed, and the degree of freedom in design can be enhanced when compared with that in the case of the prior art.

Further, the wave plates 112, 122 and 132 which form the three polarization rotation control section-wave plate pairs 110, 120 and 130 can be formed, for example, from a $\lambda/4$ wave plate, a $\lambda/2$ wave plate and another $\lambda/4$ wave plate, respectively. In particular, although each of the polarization rotation control sections 111, 121 and 131 converts (rotates) inputted light into arbitrarily linearly polarized light if the inputted light is linearly polarized light, if the lights whose polarization state is rotated by the polarization rotation control sections 111, 121 and 131 are inputted to the wave plates 112, 122 and 132, then the wave plates 112, 122 and 132 provide a phase difference to mutually orthogonally polarized light components of the inputted light to convert the polarization state.

Then, together with the polarization rotation and the provision of the phase difference to the orthogonally polarized light components by the three polarization rotation control section-wave plate pairs 110, 120 and 130 described above, the polarization state of the input light inputted from the input side optical fiber 201 can be converted into an arbitrary polarization state by an action of polarization rotation by the downstream side polarization rotation control section 141. It is to be noted that it is well known in the art as disclosed, for example, in U.S. Pat. No. 4,389,090 that the polarization state of input light can be converted into an arbitrary polarization state by passing the input light through three-stage substantially rotatable wave plates including a $\lambda/4$ wave plate, a $\lambda/2$ wave plate and another wave $\lambda/4$ plate.

In particular, where the wavelength plates 112, 122 and 132 are placed in a plurality of planes perpendicular to the advancing direction of light such that the crystal axes thereof are directed in the same direction and where the rotating action of the polarized wave principal axis in the polarization rotation control section 111 is given by $\alpha$; the rotating action of the polarized wave principal axis in the polarization rotation control section 121 is given by $\beta-\alpha$; the rotating action of the polarized wave principal axis in the polarization rotation control section 131 is given by $\gamma-\beta$; and the rotating action of the polarized wave principal axis in the downstream side polarization rotation control section 141 is given by $-\gamma$; action equivalent to that of an optical system wherein a $\lambda/4$ wave plate rotated by the angle $\alpha$ within a plane perpendicular to the advancing direction of light, a $\lambda/2$ wave plate rotated by the angle $\beta$ within a plane perpendicular to the advancing direction of light and another $\lambda/4$ wave plate rotated by the angle $\gamma$ within a plane perpendicular to the advancing direction of light are disposed in order from the input toward the output can be implemented.

It is to be noted that the polarization operation apparatus 100 according to the fourth embodiment can be formed as a polarization scrambler by using an AC waveform as the waveform of driving current to be supplied to the polarization rotation control sections 111, 121, 131 and 141. In this instance, if current waveforms having basically different frequencies from each other are used for the driving current to be supplied to the polarization rotation control sections 111, 121, 131 and 141, then the mode of polarization scrambling can be further diversified. At this time, the combination of the driving current waveforms to be applied to the polarization rotation control sections 111, 121, 131 and 141 is selected as a combination of frequencies by which the period in which the combination of driving current waveforms is repeated becomes as long as possible.

In the polarization operation apparatus 100 according to the fourth embodiment having the configuration described above, while the electromagnet driving circuits 217, 227, 237 and 247 supply driving current to the electromagnets [refer to reference numeral 3 in FIGS. 1(*a*) and 1(*b*)] which form the polarization rotation control sections 111, 121, 131 and 141 configured similarly to the polarization controlling apparatus 1 of the first embodiment described hereinabove, since the individual driving currents can be varied by the control circuit 205, each of the polarization rotation control section-waveplate pairs 110, 120 and 130 and the downstream side polarization rotation control section 141 can vary the amount of rotation of the polarization state of light inputted thereto.

Then, an arbitrary polarization state can be implemented by the combination of the provision of a phase difference between orthogonally polarized light components with reference to the crystal axes of the wave plates 112, 122 and 132 by the wave plates 112, 122 and 132 and the rotation of the polarization principal axes by the polarization rotation control section-wave plate pairs 110, 120 and 130 and the downstream side polarization rotation control section 141.

In this manner, with the polarization operation apparatus 100 according to the fourth embodiment of the present invention, there is an advantage that more various polarization states than those by the prior art can be implemented with a high-speed response characteristic through control of driving current to the electromagnets to achieve arbitrary polarization states by the polarization rotation control sections 111, 121, 131 and 141.

Further, since the polarization rotation control sections 111, 121, 131 and 141 have a configuration similar to that of the polarization controlling apparatus 1 [refer to FIGS. 1(*a*) and 1(*b*)] of the first embodiment described hereinabove, similar advantages to whose of the first embodiment can be anticipated.

D2. Modification to the Fourth Embodiment

It is to be noted that, although a polarization controlling apparatus of a configuration similar to that of the polarization controlling apparatus 1 of the first embodiment is applied to the polarization rotation control sections 111, 121, 131 and 141 in the fourth embodiment described above, according to the present invention, the configuration of the polarization rotation control sections 111, 121, 131 and 141 is not limited to this. For example, any of the polarization controlling apparatus of the modifications to the first embodiment, the second embodiment and the modifications to the second embodiment can naturally be applied if it has a transmission type configuration [refer to FIGS. 2(*a*), 3, 7, 13 to 15, 17, 21 and so forth] wherein the Faraday rotator 4 passes light therethrough.

Further, for the polarization rotation control sections 111, 121, 131 and 141 disposed in tandem at multi stages, polarization rotation control sections of different configurations may be adopted. Further, also the number of stages of the tandem disposition of the polarization rotation control section-wave plate pairs may be any other number than that in the fourth embodiment described hereinabove at least if it is a plural number. In order to facilitate designing, a plurality of wave plates in a plurality of polarization rotation control section-wave plate pairs are disposed such that the crystal axes thereof are all directed in the same direction in a plurality of planes perpendicular to the advancing direction of light.

Further, although the wave plates 112, 122 and 132 which constitute the polarization rotation control section-wave plate pairs 110, 120 and 130 are selected as a combination of a λ/4 wave plate, a λ/2 wave plate and another λ/4 wave plate, according to the present invention, another combination of wave plates, that is, a combination of wave plates different from the wave plates described above, may be used if a phase difference between orthogonally polarized light components is produced. It is to be noted that, in order to facilitate designing, the wave plates are disposed such that the crystal axes thereof are all directed in the same direction in a plurality of planes perpendicular to the advancing direction of light.

Further, in the polarization operation apparatus 100 according to the fourth embodiment described above, the polarization rotation control sections 111, 121, 131 and 141 have a configuration similar to that of the polarization controlling apparatus 1 [refer to FIGS. 1(*a*) and 1(*b*)] of the first embodiment described hereinabove and have a transmission type configuration wherein light of an object of polarization rotation control passes through a Faraday rotator [refer to reference numeral 4 in FIGS. 1(*a*) and 1(*b*)]. However, according to the present invention, for the polarization rotation control sections 111, 121, 131 and 141, an alternative configuration which corresponds to a polarization controlling apparatus of a reflection type configuration wherein, after light of an object of polarization rotation control is introduced into a Faraday rotator (for example, refer to reference numeral 4 in FIG. 4) and undergoes polarization rotation control by the Faraday rotator, it is reflected by a reflecting member (refer to reference numeral 8 in FIG. 4) so that it is emitted through the original incident plane maybe adopted. Also in this instance, advantages similar to those of the fourth embodiment described hereinabove can be achieved.

Figure 25:
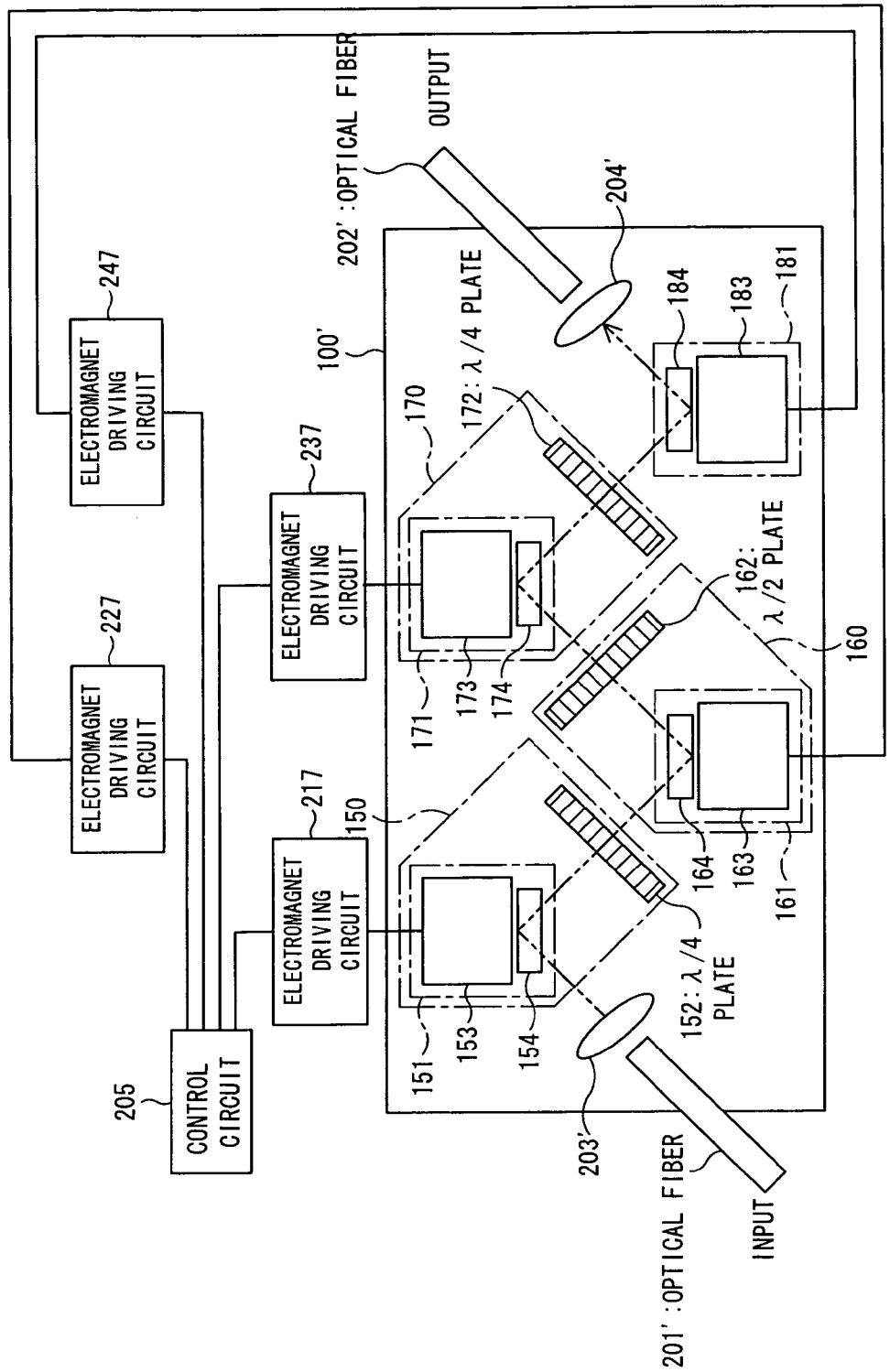
FIG. 25 is a block diagram showing a polarization controlling apparatus having a polarization scrambler function according to the present invention, in which a polarization controlling apparatus of the reflection type according to the present invention is utilized.

For example, like a polarization operation apparatus 100' shown in FIG. 25, a polarization operation apparatus is configured such that polarization rotation control section-wave plate pairs 150, 160 and 170 including polarization rotation control sections 151, 161 and 171 having a configuration as a polarization controlling apparatus of a reflection type configuration are disposed successively from the upstream side on a light propagation path and a polarization rotation control section 181 is provided on the downstream side of the polarization rotation control section-wave plate pair 170. The polarization rotation control section-wave plate pairs 150, 160 and 170 functionally correspond to the polarization rotation control section-wave plate pairs 110, 120 and 130 in the fourth embodiment and include similar wave plates 152, 162 and 172, respectively. It is to be noted that, in FIG. 25, like reference characters denote substantially like elements to those of FIG. 24.

It is to be noted that, since the polarization rotation control sections 151, 161, 171 and 181 have a configuration as a polarization controlling apparatus of a reflection type configuration, the incidence and emergence angles of light to and from optical fibers 201' and 202' of the input side and the output side and the arrangement of lenses 203' and 204' are changed from those in FIG. 24 and the polarization rotation control sections 151, 161, 171 and 181 and the wavelength plates 152, 162 and 172 are disposed such that the optical fibers 201' and 202' are optically coupled to each other therethrough and conversion of the polarization state is performed thereby in a similar manner as in the case of FIG. 24.

It is to be noted that reference numerals 154, 164, 174 and 184 in FIG. 25 denote each a Faraday rotator (refer to, for example, reference numeral 4 in FIGS. 4, 6 and 8) having a reflecting member provided on a face remote from the incidence face for light, and reference numerals 153, 163, 173 and 183 denote electromagnets (refer to, for example, reference numeral 3 in FIGS. 4, 6 and 8) which are driven by driving current from the electromagnet driving circuits 217, 227, 237 and 247, respectively. Further, in FIG. 25, any other component of the polarization rotation control sections 151,

161, 171 and 181 than the electromagnets 153, 163, 173 and 183 and the Faraday rotators 154, 164, 174 and 184 is omitted.

Figure 26:
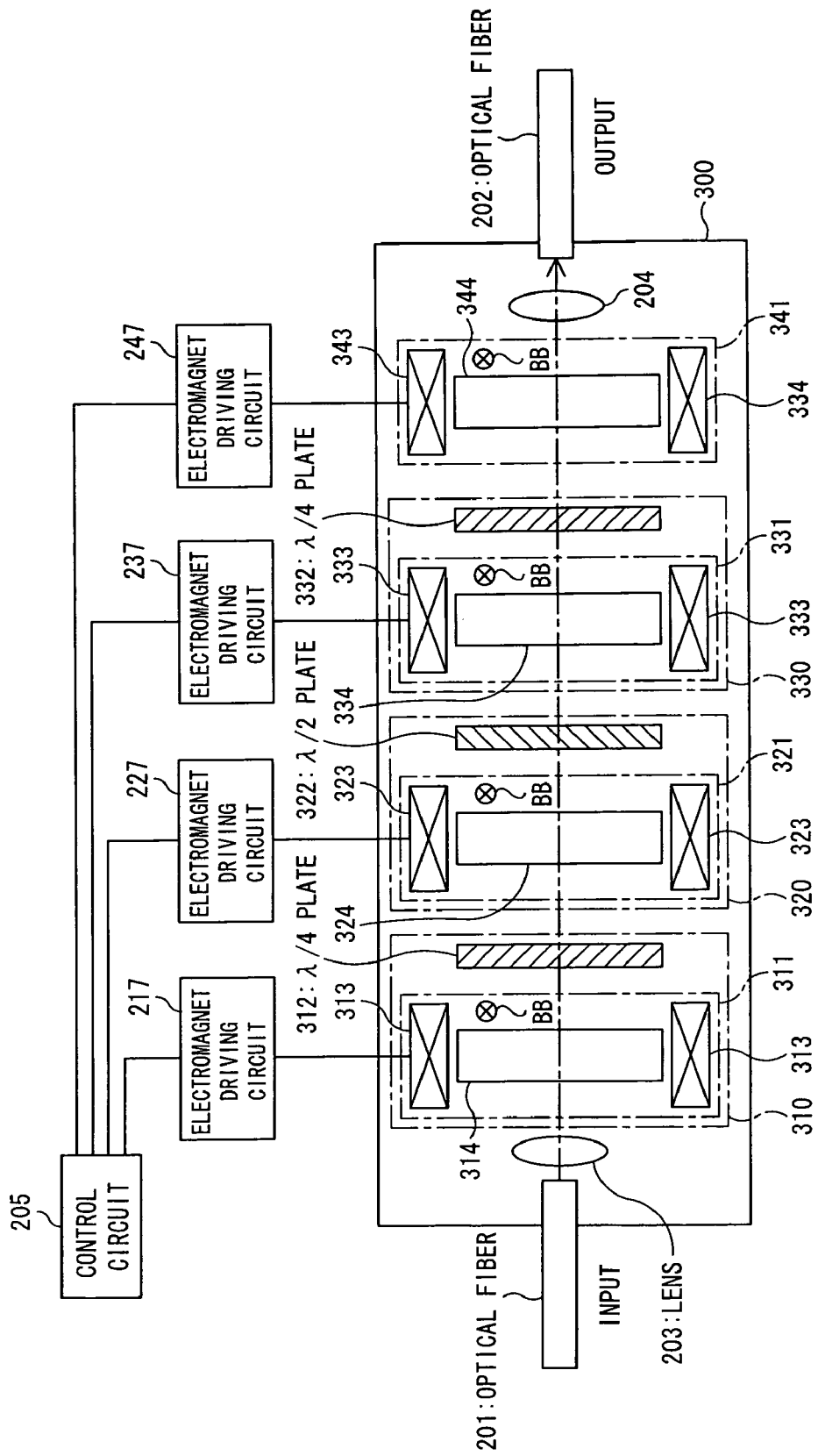
FIG. 26 is a block diagram showing a polarization controlling apparatus having a polarization scrambler function according to the present invention, in which a polarization controlling apparatus of the transmission type according to the present invention is utilized.

Furthermore, the polarization rotation control sections 111, 121 and 131 of the polarization rotation control section-wave plate pairs 110, 120 and 130 and the downstream side polarization rotation control section 141 in FIG. 24 maybe replaced by polarization rotation control sections 311, 321, 331 and 341 having a configuration for generating a magnetic field for a Faraday rotation effect directly by means of an electromagnet like a polarization control apparatus 300 shown in FIG. 26. Also with the configuration just described, at least more various polarization states than those by the prior art can be implemented.

In particular, as a configuration which corresponds to the polarization rotation control sections 111, 121 and 131 of the polarization rotation control section-wave plate pairs 110, 120 and 130 in FIG. 24, the polarization control apparatus 300 includes such polarization rotation control sections 311, 321 and 331 as shown in FIG. 26. Similarly, as a configuration which corresponds to the downstream side polarization rotation control section 141, the polarization control apparatus 300 includes a polarization rotation control section 341 shown in FIG. 26. Further, wave plates 312, 322 and 332 correspond to the waveplates 112, 122 and 132 shown in FIG. 24, respectively, and have a similar configuration.

Consequently, polarization rotation control section-wave plate pairs 310, 320 and 330 are composed of the polarization rotation control sections 311, 321 and 331 and the wave plates 312, 322 and 332, respectively. It is to be noted that, in FIG. 26, like reference characters denote substantially like elements to those of FIG. 24.

Here, the polarization rotation control sections 311, 321, 331 and 341 include Faraday rotators (Faraday rotation effect elements) 314, 324, 334 and 344 and electromagnets 313, 323, 333 and 343 shown in section in FIG. 26 and having a tubular configuration surrounding a Faraday rotator, respectively. It is to be noted that magnets not shown in FIG. 26 may be used to apply bias magnetic fields in a direction perpendicular to the plane of FIG. 26 as denoted by BB in FIG. 26 to the Faraday rotators (Faraday rotation effect elements) 314, 324, 334 and 344 so that each of the Faraday rotators may always have a single magnetic domain thereby to minimize the loss by the Faraday rotators.

The Faraday rotators 314, 324, 334 and 344 exert a Faraday rotation effect on light inputted thereto through a magnetic field. Further, the electromagnets 313, 323, 333 and 343 directly generate magnetic fields which exert a Faraday rotation effect from the corresponding Faraday rotators 314, 324, 334 and 344 (that is, magnetic fields including magnetic field components parallel to the propagation direction of light), respectively. In this instance, the magnitude of the magnetic fields can be varied.

In particular, by varying the magnitude of the magnetic fields to act upon the Faraday rotators 314, 324, 334 and 344 using magnetic fields provided by the electromagnets 313, 323, 333 and 343 based on driving current supplied from the electromagnet driving circuits 217, 227, 237 and 247, the magnitude of Faraday rotation effects generated by the Faraday rotators 314, 324, 334 and 344 can be varied, respectively, and the polarization state of light inputted can be rotated by an arbitrary amount thereby.

It is to be noted that the polarization rotation control sections 111, 121, 131 and 141 in the fourth embodiment described above may be configured otherwise by a suitable combination of such modifications as described hereinabove.

E. Others

The present invention can be carried out in various modified forms without departing from the spirit and scope of the present invention regardless of the embodiments described hereinabove.

Further, those skilled in the art could manufacture the apparatus of the present invention based on the disclosure of the embodiments described hereinabove.

What is claimed is:

1. A polarization controlling apparatus, comprising:
a permanent magnet;
an electromagnet capable of changing the magnitude of a magnetic field to be generated thereby; and
a Faraday rotation effect elements disposed at a position at which an interaction magnetic field acts on the Faraday rotation effect element, wherein
the interaction magnetic field is produced by an interaction between a magnetic field generated by said permanent magnet itself or by said permanent magnet having a magnetic pole to which a part capable of being magnetized is applied and a magnetic field generated by said electromagnet,
the Faraday rotation effect element thereby produces a Faraday rotation effect on inputted light, and
the magnitude of the interaction magnetic field in said Faraday rotation effect element is varied by a magnetic field component generated by said electromagnet to vary the amount of the Faraday rotation effect to be had on the inputted light.

2. The polarization controlling apparatus as claimed in claim 1, further comprising a control section for variably controlling the magnetic field component to be generated by said electromagnet in response to the amount of the Faraday rotation effect to be produced on the inputted light.

3. The polarization controlling apparatus as claimed in claim 1, wherein an optical path for a direction same as or opposite to the direction of the interaction magnetic field is provided for the inputted light.

4. The polarization controlling apparatus as claimed in claim 1, further comprising a reflection member for reflecting the inputted light having passed through said Faraday rotation effect element.

5. The polarization controlling apparatus as claimed in claim 1, further comprising a bias magnetic field application section for applying a bias magnetic field for magnetizing said Faraday rotation effect element into a saturation state in a direction perpendicular to the interaction magnetic field.

6. The polarization controlling apparatus as claimed in claim 1, wherein said electromagnet includes a core member made of a ferrite material and a winding provided on said core member.

7. The polarization controlling apparatus as claimed in claim 1, wherein said electromagnet is disposed such that a face thereof which serves as a magnetic pole face is opposed to one of magnetic pole faces of said permanent magnet itself or of said permanent magnet having a magnetic pole to which a part capable of being magnetized is applied, and
said Faraday rotation effect element is disposed at a position at which a magnetic field in a direction substantially in parallel to a plane positioned between the magnetic pole faces opposed to each other by said permanent magnet and said electromagnet acts as the interaction magnetic field.

8. The polarization controlling apparatus as claimed in claim 7, wherein the polarity of the magnetic pole of said electromagnet opposed to said permanent magnet is determined as the polarity same as that of the magnetic pole of said permanent magnet which is opposed to said electromagnet to increase the magnitude of the interaction magnetic field to the amount of the Faraday rotation effect to be had on the inputted light.

9. The polarization controlling apparatus as claimed in claim 7, wherein a substance whose magnetic relative permeability in a non-saturation state is 10 or less is interposed between the magnetic pole faces opposed to each other of said permanent magnet itself or of said permanent magnet having a magnetic pole to which a part capable of being magnetized is applied and said electromagnet.

10. The polarization controlling apparatus as claimed in claim 1, wherein said electromagnet includes a first core section which contacts at one end thereof with one of the magnetic pole sides of said permanent magnet itself or of said permanent magnet having a magnetic pole to which a part capable of being magnetized is applied, a second core section disposed such that one end thereof is connected to the other end of said first core section and the other end thereof is positioned near to the other magnetic pole side of said permanent magnet itself or of said permanent magnet having a magnetic pole to which a part capable of being magnetized is applied, and a winding provided on said second core section, said Faraday rotation effect element being disposed in the proximity of the one or the other magnetic pole of said permanent magnet, a magnetic field component to be generated by said electromagnet being variably controlled by current to be supplied to said winding to vary the amount of the Faraday rotation effect to be had on the inputted light.

11. The polarization controlling apparatus as claimed in claim 10, wherein the direction of the magnetic field component to be generated by said electromagnet is determined as a direction opposite to a magnetic field direction generated by said permanent magnet to increase the magnitude of the interaction magnetic field thereby to increase the amount of the Faraday rotation effect to be had on the inputted light.

12. The polarization controlling apparatus as claimed in claim 10, wherein said first core section is made of a substance whose magnetic relative permeability in a non-saturation state is 10 or more.

13. The polarization controlling apparatus as claimed in claim 1, wherein said electromagnet is disposed such that a face whereof which functions as a magnetic pole face is opposed to one of magnetic pole faces of said permanent magnet, and said Faraday rotation effect element is disposed at a position at which a magnetic field in a direction substantially perpendicular to a plane positioned between the magnetic pole faces opposed to each other of said permanent magnet and said electromagnet acts as the interaction magnetic field.

14. The polarization controlling apparatus as claimed in claim 13, wherein the direction of a magnetic field component to be generated by said electromagnet is determined as a direction same as a magnetic field direction generated by said permanent magnet to increase the magnitude of the interaction magnetic field thereby to increase the amount of the Faraday rotation effect to be had on the inputted light.

15. The polarization controlling apparatus as claimed in claim 13, wherein a substance whose relative magnetic permeability in a non-saturation state is 10 or less is interposed between the magnetic pole faces opposed to each other of said permanent magnet and said electromagnet.

16. A polarization operation apparatus, comprising:

a plurality of polarization rotation control section-wave plate pairs, each formed from a polarization rotation control section for rotationally controlling a polarization state of light and a wave plate disposed on the downstream side of said polarization rotation control section in a propagation direction of the light, and disposed in tandem along the propagation direction of the light, and a downstream side polarization rotation control section, provided on the downstream side in the propagation direction of light with respect to said plural polarization rotation control section-wave plate pairs, for rotationally controlling a polarization state of the light, wherein at least one of said polarization rotation control sections which form said polarization rotation control section-wave plate pairs and said downstream side polarization rotation control section comprises:

a permanent magnet, an electromagnet capable of changing the magnitude of a magnetic field to be generated thereby, and a Faraday rotation effect element disposed at a position at which an interaction magnetic field acts on the Faraday rotation effect element, wherein the interaction magnetic field is produced by an interaction between a magnetic field generated by said permanent magnet itself or by said permanent magnet having a magnetic pole to which a part capable of being magnetized is applied and a magnetic field generated by said electromagnet, the Faraday rotation effect element thereby produces a Faraday rotation effect on inputted light, and the magnitude of the interaction magnetic field in said Faraday rotation effect element is varied by a magnetic field component generated by said electromagnet to vary the amount of the Faraday rotation effect to be had on the inputted light.

17. The polarization operation apparatus as claimed in claim 16, wherein three such polarization rotation control section-wave plate pairs are disposed in tandem along the propagation direction of the light.

* * * * *

UNITED STATES PATENT AND TRADEMARK OFFICE
CERTIFICATE OF CORRECTION

PATENT NO.        : 7,535,616 B2
APPLICATION NO.   : 11/529347
DATED             : May 19, 2009
INVENTOR(S)       : Kazuo Hironishi et al.

It is certified that error appears in the above-identified patent and that said Letters Patent is hereby corrected as shown below:

Column 28, Line 18, change "elements" to --element--.

Signed and Sealed this

Twenty-ninth Day of September, 2009

David J. Kappos
*Director of the United States Patent and Trademark Office*